United States Patent

Yamashita et al.

[11] Patent Number: 5,982,377
[45] Date of Patent: Nov. 9, 1999

[54] THREE-DIMENSIONAL GRAPHIC DISPLAYING SYSTEM AND METHOD

[75] Inventors: Kiyomi Yamashita; Kouzo Nagano; Harunobu Izato, all of Kawasaki; Iwao Kakegawa, Nagano; Yasuyuki Hikosaka, Nagano; Yoshinobu Haccho, Nagano, all of Japan

[73] Assignee: Fujitsu Limited, Kawasaki, Japan

[21] Appl. No.: 08/831,014

[22] Filed: Mar. 31, 1997

[30] Foreign Application Priority Data

Apr. 19, 1996 [JP] Japan .................................. 8-098769

[51] Int. Cl.⁶ .................................................. G06T 17/00
[52] U.S. Cl. .............................................................. 345/427
[58] Field of Search .................................... 345/427, 428, 345/429, 418

[56] References Cited

U.S. PATENT DOCUMENTS

| | | | |
|---|---|---|---|
| 5,781,194 | 7/1998 | Ponomarev et al. | 345/427 |
| 5,867,168 | 2/1999 | Seki et al. | 345/427 |
| 5,870,099 | 2/1999 | Horii et al. | 345/427 |
| 5,877,769 | 3/1999 | Shinohara | 345/427 |

*Primary Examiner*—Phu K. Nguyen
*Assistant Examiner*—Cliff N. Vo
*Attorney, Agent, or Firm*—Staas & Halsey

[57] ABSTRACT

A three-dimensional graphic displaying system and its method allow a viewpoint to a displayed graphic to change when the displayed graphic is rotated or moved. By including a data generating unit for generating scale mark data for respective variable values corresponding to each coordinate axis, as a combination of two or more lines which exist on a plane perpendicular to a coordinate axis, and are not located on an identical straight line; a viewpoint converting unit for converting the generated data into data of a coordinate system which varies depending on a position of a user viewpoint; and a displaying unit for two-dimensionalizing the converted data, and displaying the two-dimensionalized data on a display unit in correspondence with the position of the user viewpoint, the positions of the scale marks can be identified even if the viewpoint exists in an extended portion of the scale marks on the coordinate axis.

43 Claims, 35 Drawing Sheets

(PRIOR ART)

FIG. 7
(PRIOR ART)
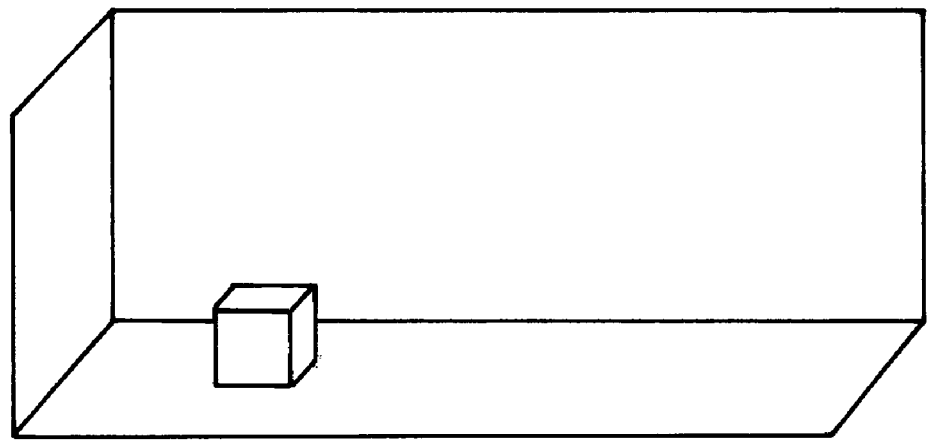
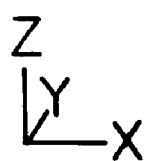

FIG. 8
(PRIOR ART)
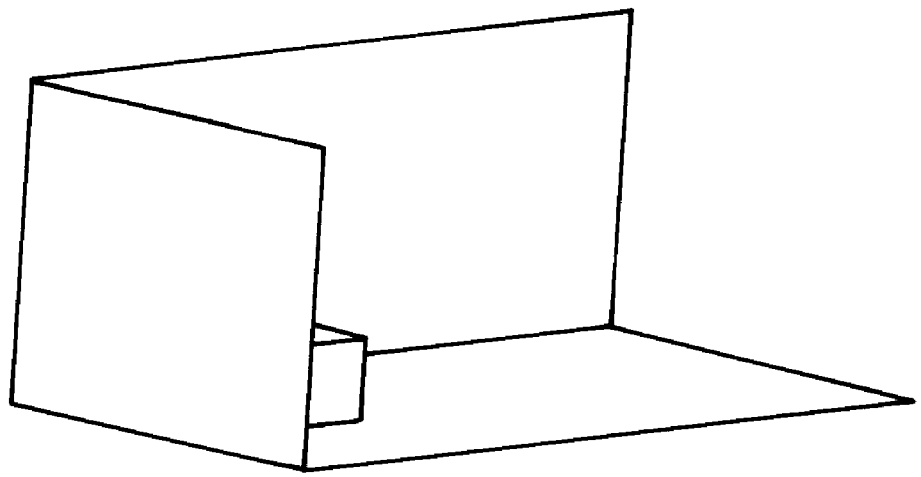
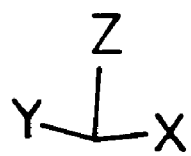

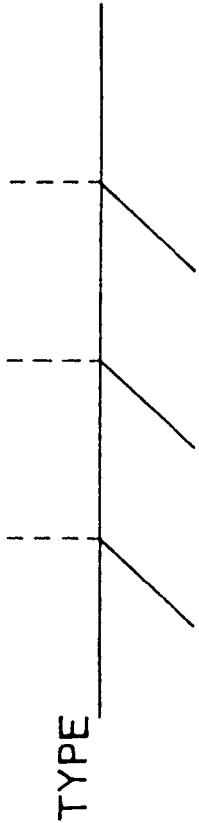
FIG.15A VARIATION OF LINE TYPE (POSITIVE RANGE)
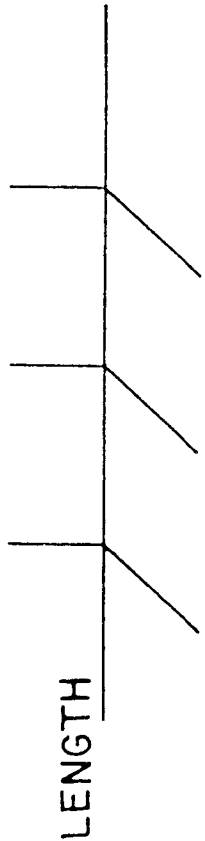
FIG.15B VARIATION OF LINE LENGTH (POSITIVE RANGE)
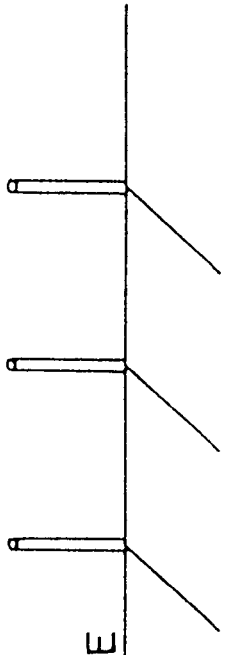
FIG.15C VARIATION OF GRAPHIC SHAPE (POSITIVE RANGE)
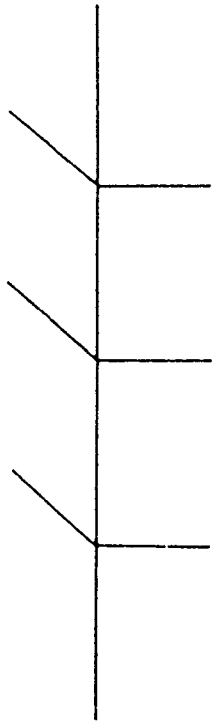
FIG.15D EXAMPLE OF CASE IN WHICH ONLY NEGATIVE RANGES ARE DRAWN

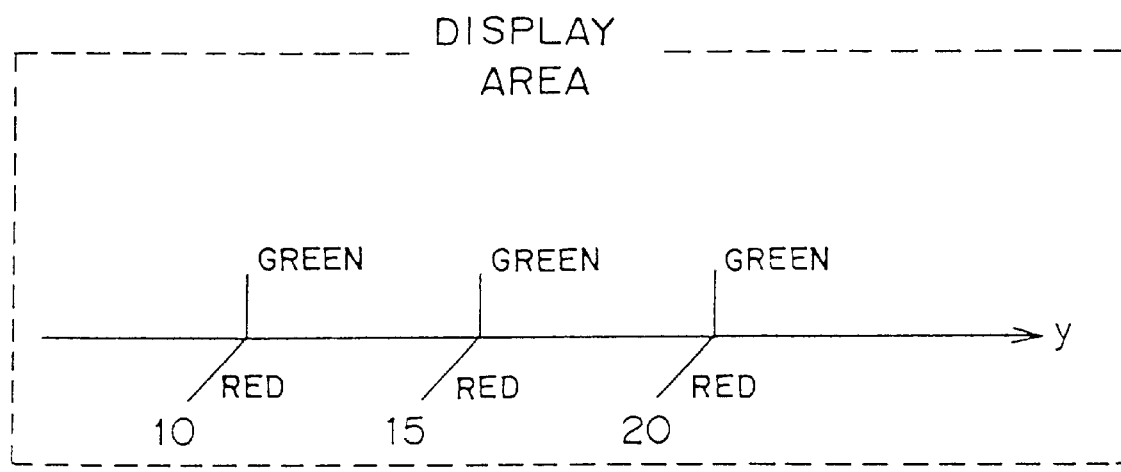
F I G. 21

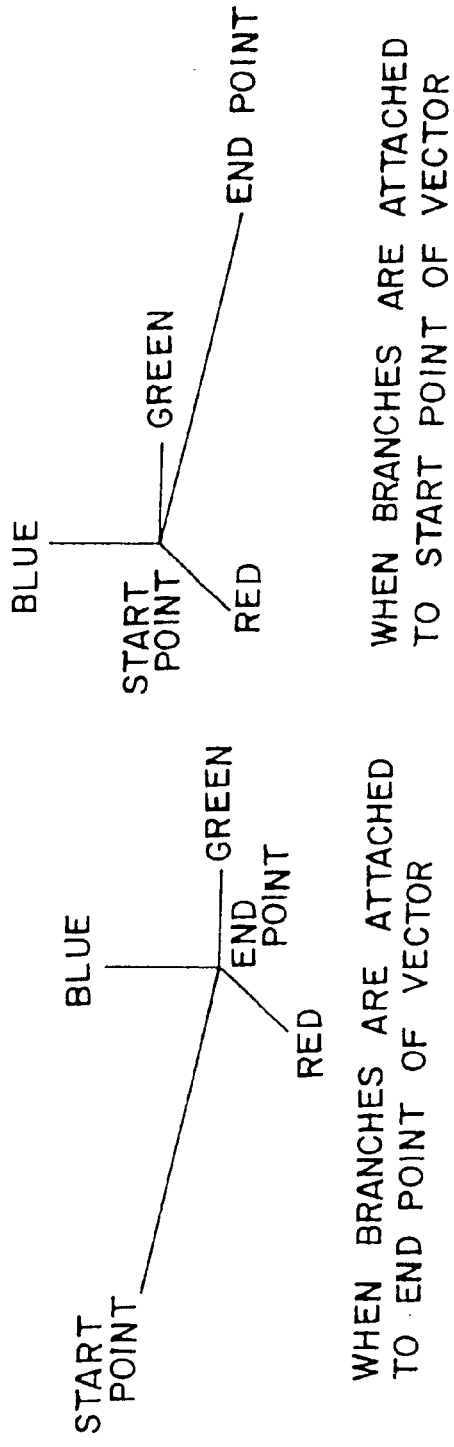
FIG. 23A — WHEN BRANCHES ARE ATTACHED TO END POINT OF VECTOR
FIG. 23B — WHEN BRANCHES ARE ATTACHED TO START POINT OF VECTOR
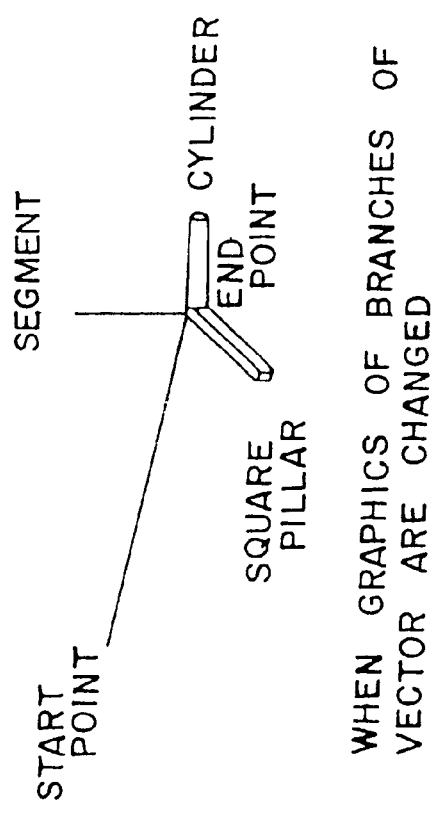
FIG. 23C — WHEN GRAPHICS OF BRANCHES OF VECTOR ARE CHANGED

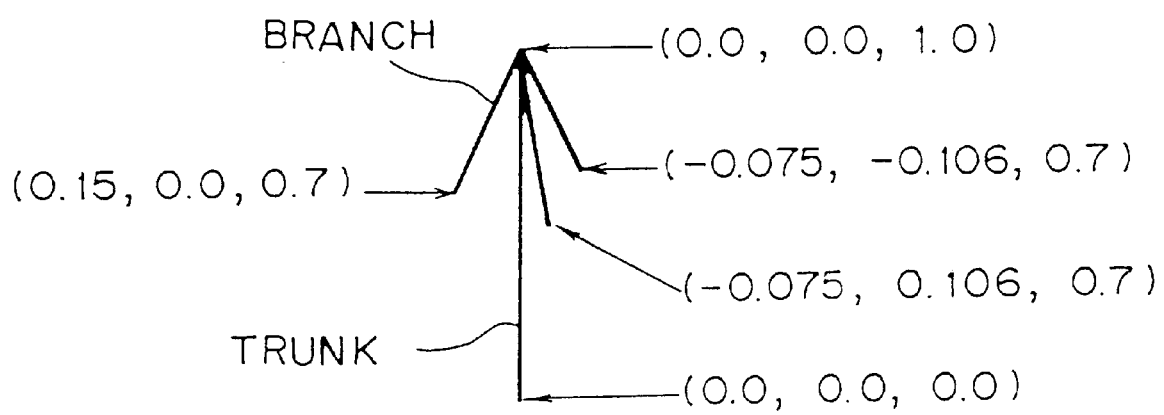
F I G. 26

FIG. 30
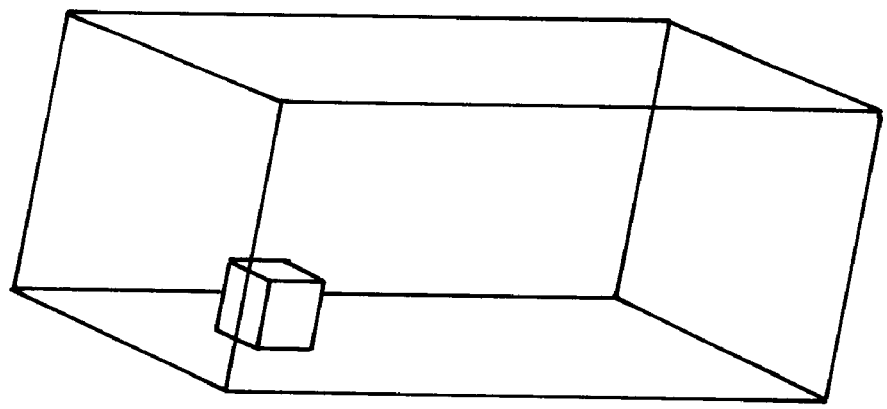
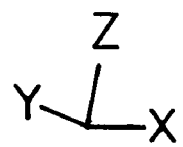

FIG. 33
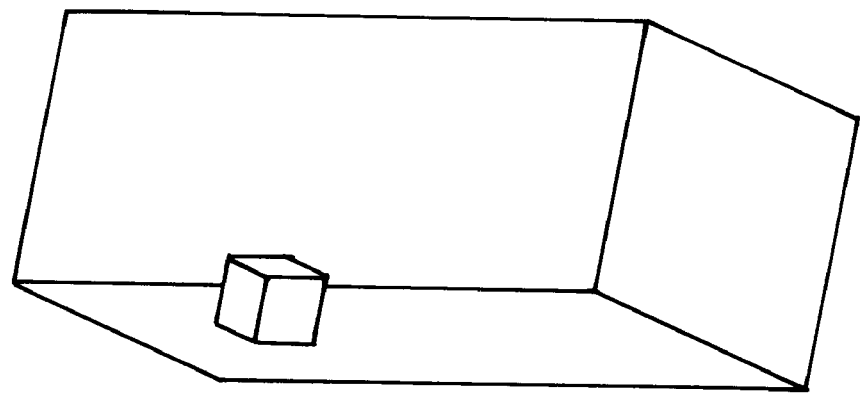
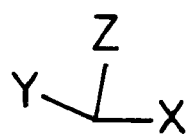

FIG. 34
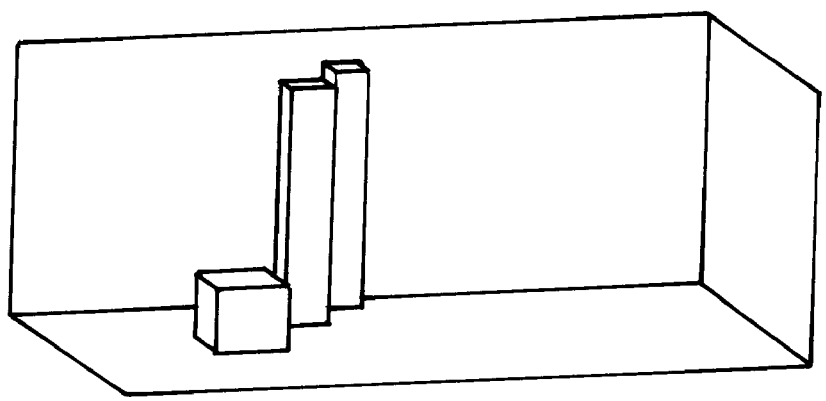

FIG. 35A
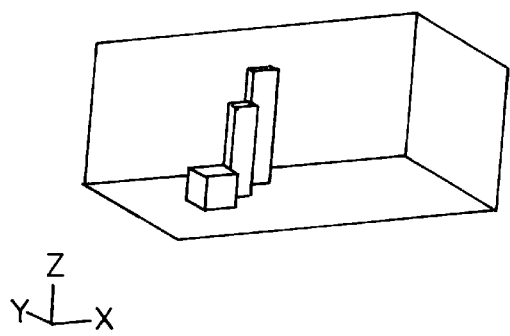
FIG. 35B
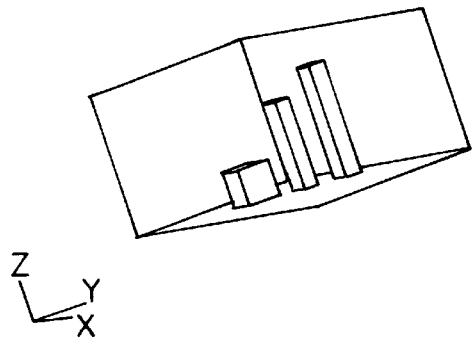
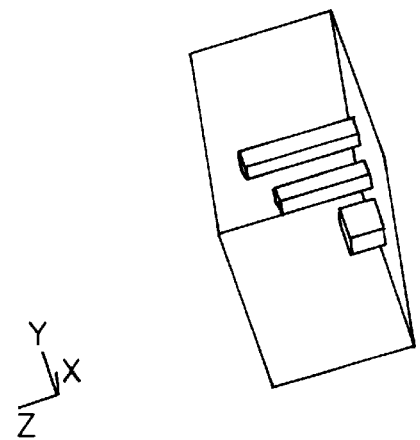
FIG. 35C
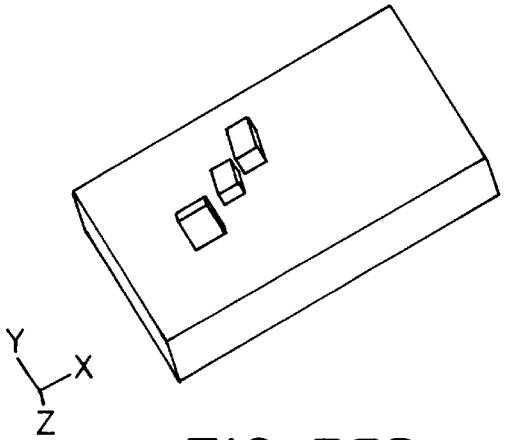
FIG. 35D

THREE-DIMENSIONAL GRAPHIC DISPLAYING SYSTEM AND METHOD

BACKGROUND OF THE INVENTION

1. Field of the Invention

The present invention relates to a three-dimensional graphic displaying system equipped with a capability for allowing a change of a viewpoint from which a user sees a graphic, when a displayed graphic is rotated or moved, and more particularly into a three-dimensional graphic displaying system for allowing positions of scale marks on a coordinate axis to be identified at any time, even if such a viewpoint change is made.

2. Description of the Related Art

With a conventional three-dimensional graphic displaying system, scale marks are normally displayed in one direction, for example, when three-directional axes and scale marks are displayed in a three-axial graph. FIG. 1 exemplifies a method for displaying three-dimensional axes and scale marks. In this figure, the scale marks on the x, y, and z axes are respectively displayed only on an x-y plane, y-z plane, and an x-z plane.

Such a displaying method works properly for a three-dimensional graphic displaying system which uses a fixed viewpoint. However, it prevents the position of scale marks from being identified in a displaying system which enables a viewpoint of a displayed graphic to change, after a user operation such as a rotation operation, move operation, etc. This is because the scale marks are seen as mere dots and an axis is drawn over the dots, when a viewpoint comes to an extended portion of the scale marks;.

FIG. 2 is a schematic diagram illustrating such a problem. This figure illustrates the coordinate axes seen from a direction perpendicular to the y-z plane, that is, the axes and scale marks seen from the x-axis. Since the scale marks of the z axis overlap the z axis, the positions of the scale marks cannot be identified. Similarly, if the coordinate axes shown in FIG. 1 are seen from a direction perpendicular to the z-x plane or a direction perpendicular to the x-y plane, the scale marks of the x axis or the y axis respectively overlap the x axis or the y axis. As a result, the position of the scale marks cannot be identified.

When other axes become invisible from the display area due to a viewpoint move or expansion in the region of a particular mark, on the condition that the axes and scales are displayed as shown in FIG. 1, the direction from which the user sees the displayed portion, cannot be recognized. This is because the other axes serving as direction indicators are not displayed. FIG. 3 exemplifies such a case. It shows a display state of the y axis when the other two axes except for the y axis, that is, the x and z axes are outside the display area. In this display state, the direction from which the user sees the portion of the y axis appearing in the displayed area, cannot be recognized. That is, scale marks themselves on an axis do not possess the capability for indicating a viewpoint direction, according to the conventional scale displaying method.

Provided next is the explanation about a method for displaying a vector for use in the conventional three-dimensional graphic displaying system. FIG. 4 is a schematic diagram for explaining an example of a conventional vector display. In this figure, the vector is one-dimensionally displayed using both a line linking its start and end points (hereinafter referred to as the trunk of the vector), and two short lines attached to the end point (hereinafter referred to as branches) in order to form an arrow as the whole, or displayed using a two-dimensional graphic such as a triangle.

With such a vector displaying method for use in a three-dimensional graphic displaying system which uses a fixed viewpoint, a distinction between start and end points of a vector can normally and constantly be made, and a suitable display can be made. However, if such a method is used in a displaying system which allows a viewpoint to change, the trunk and branches of the vector overlap on the condition that the vector is located on the plane identical to the direction of the viewpoint. Therefore, the distinction between the start and end points cannot be made.

FIGS. 5A to 5C are schematic diagrams for explaining such a problem. As shown in FIG. 5A, if a viewpoint exists in the direction perpendicular to the x-y plane, the distinction between the start and end points of a vector can be made. However, if the viewpoint exists in the direction perpendicular to the y-z plane as shown in FIG. 5B, or in the direction perpendicular to the z-x plane as shown in FIG. 5C, the trunk and branches of the vector overlap. Therefore, the distinction between the start and end points of the vector cannot be made.

Furthermore, if a coordinate axis is outside a display area due to the expansion of a region of a particular mark when a vector is displayed with the conventional displaying method, the direction indicator disappears. As a result, the direction from which the vector is seen, cannot be identified.

FIG. 6 is a schematic diagram explaining such a problem. This figure shows a display state of a vector when the three axes are outside the display area. Since the three axes disappear from the display area in this figure, the direction from which the vector is seen cannot be identified.

Provided last is the explanation about a method of displaying an inside of a solid body.

FIG. 7 exemplifies a conventional method for displaying an inside of a solid body. This figure shows one cube included in the rectangular solid body. In this figure, the graphic display is made by removing the front, upper, and right surfaces of the solid body in order to exhibit the existence of the included cube.

As described above, the method for displaying an internal state of a solid body by removing a portion of the solid body, works properly in a three-dimensional graphic displaying system which uses a fixed viewpoint. However, if this method is used in a displaying system which allows a viewpoint to change, the inside of the solid body cannot be displayed when an unremoved side exists, for example, between the cube to be identified and the viewpoint. As a result, the included cube cannot be identified.

FIG. 8 is a schematic diagram explaining such a problem. This figure shows the state in which a solid body in the form of FIG. 7 is seen obliquely from the left front. Since surfaces to be removed are determined in a conventional displaying system, a portion of the included cube is hidden by the left side surface, as shown in FIG. 8. Accordingly, the included object cannot be completely identified.

If the conventional method for displaying scale marks on an axis is used in a three-dimensional graphic displaying system which allows a viewpoint of a displayed graphic to change, by a user operation such as a rotation operation and a move operation for the displayed graphic, the scale marks are merely seen as dots when the viewpoint exists in an extended portion of the scale marks on the axis. Since the axis is drawn over the dots, a first problem that the positions of the scale marks cannot be identified, arises.

Additionally, a second problem exists, in that the direction from which the display area is seen cannot be recognized when the other axes become invisible in the display area, according to the conventional method for displaying coordinate axes and scales when used in such a three-dimensional graphic displaying system.

Additionally, if the conventional method for displaying a vector is used in such a system for displaying a three-dimensional graphic, which allows a viewpoint to change, the trunk and branches of the vector overlap when the vector display graphic is drawn on a plane whose direction is identical to that of a sightline. As a result, a third problem that the distinction between the start and end points cannot be made, arises.

Furthermore, if a coordinate axis disappears from a display area due to an enlargement of the region of a graphic for which a vector is displayed, in such a displaying system, a fourth problem that a direction from which the vector is seen cannot be recognized, arises.

Still further, when an attempt is made to identify an object included in a solid body in such a three-dimensional graphic displaying system which allows a viewpoint to change, a fifth problem arises in that an object included in a solid body cannot be identified when an unremoved surface of the solid body exists between the included object to be displayed and the viewpoint.

SUMMARY OF THE INVENTION

A first object of the present invention is to allow positions of scale marks on a coordinate axis to be identified, from whichever direction a viewpoint is changed to.

A second object of the present invention is to allow a direction from which a display area including one coordinate axis is seen, to be identified, even if the other coordinate axes disappear from the display area.

A third object of the present invention is to allow start and end points of a vector to be identified, from whichever direction a viewpoint is changed to.

A fourth object of the present invention is to allow a direction from which a vector is seen, to be identified, even if coordinate axes disappear from a displayed area.

A fifth object of the present invention is to allow an object included in a solid body to be identified, from whichever direction a viewpoint is changed to.

To attain the first and second objects, scale mark data for respective values of variables corresponding to a coordinate axis to be displayed are generated as a combination of two or more lines which are on a plane perpendicular to the coordinate axis to be displayed, and are not located on an identical straight line, and the coordinate axis is displayed in correspondence with a position of a user viewpoint, by using the scale mark data, according to the present invention.

For example, the scale mark data are generated so that the above described two or more lines are made parallel to respective axes other than the coordinate axis to be displayed, and the two or more lines can be distinguished from the axes parallel to the lines.

To attain the third and fourth objects, vector display data is generated so that three or more lines which are not located on an identical plane, and are shorter than a length corresponding to a size of a vector to be displayed, are attached at the start point or the end point of the vector, and a vector display graphic is displayed on a display unit in correspondence with a user viewpoint, by using the vector display data.

For example, the vector display data is generated so that the above described three or more lines are made parallel to respective coordinate axes indicating a display space in which a vector is to be displayed, and the lines are made distinct from the respectively parallel axes.

To attain the fifth object, a direction in which each surface structuring an object is seen from an arbitrary point inside the object is defined as a right direction of each surface, and only a surface determined to be a right direction is displayed on a display unit, depending on a position of a user viewpoint, according to the present invention.

As described above, scale marks on a coordinate axis and an internal state of a solid body can be identified at any time, and the distinction between start and end points of a vector can be made, in a three-dimensional graphic displaying system which allows a viewpoint to change, according to the present invention.

BRIEF DESCRIPTION OF THE DRAWINGS

FIG. 7 exemplifies a display of an inside of a solid body in the conventional three-dimensional graphic displaying system;

FIG. 8 exemplifies a display when a viewpoint is changed from the state of FIG. 7, in the conventional three-dimensional graphic displaying system;

FIGS. 15A to 15D show another examples of a distinction of scale marks, according to the first embodiment;

FIG. 21 exemplifies a display state when two coordinate axes are outside a display area, according to the first embodiment;

FIGS. 23A to 23C are schematic diagrams showing examples of displaying vector graphics whose branches are parallel to directions of coordinate axes, according to the second embodiment;

FIG. 26 is a schematic diagram explaining a standard arrow graphic, according to the second embodiment;

FIG. 30 exemplifies a display of an inside of a solid body, according to a third embodiment;

FIG. 33 shows another example of the method for displaying an inside of a solid body, according to the third embodiment;

FIG. 34 shows a further example of the method for displaying an inside of a solid body, according to the third embodiment; and FIGS. 35A to 35D is a schematic diagram showing a display state in the case in which an inside of a solid body is seen from various directions, according to the third embodiment.

DESCRIPTION OF THE PREFERRED EMBODIMENTS

Figure 9:
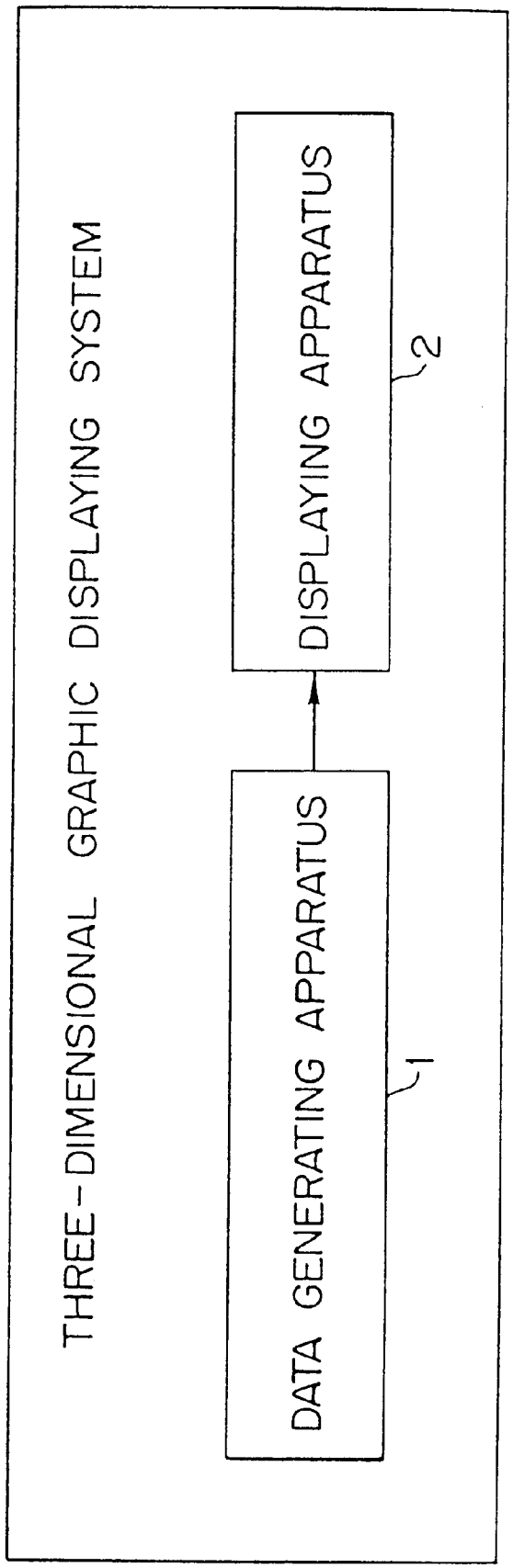
FIG. 9 is a block diagram showing the principle of the present invention.

FIG. 9 is a block diagram showing the principle of the present invention. This figure shows the principle for implementing the present invention in a three-dimensional graphic displaying system which can change a viewpoint for seeing a displayed graphic, as the displayed graphic rotates or moves according to a user operation.

The first embodiment of the present invention realizes a three-dimensional graphic displaying system which overcomes the above described first and second problems. That is, it attains the objects that positions of scale marks can be identified even if a viewpoint exists in an extended portion of the scale marks on a coordinate axis, and that a direction from which a user sees an enlarged portion can be identified even if the region of the scale marks in a portion of a coordinate axis is expanded and other axes cannot be seen in a display area.

According to the first embodiment, a data generating apparatus 1 shown in FIG. 9 is intended to generate scale mark data for respective variable values corresponding to a coordinate axis, as a combination of two or more lines which exist on a plane perpendicular to a coordinate axis to be displayed, and are not located on an identical straight line, in order to display the coordinate axis.

A displaying apparatus 2 is intended to display a coordinate axis and its scale marks in correspondence with a position of a user viewpoint, by using scale mark data generated by the data generating apparatus 1.

Figure 1:
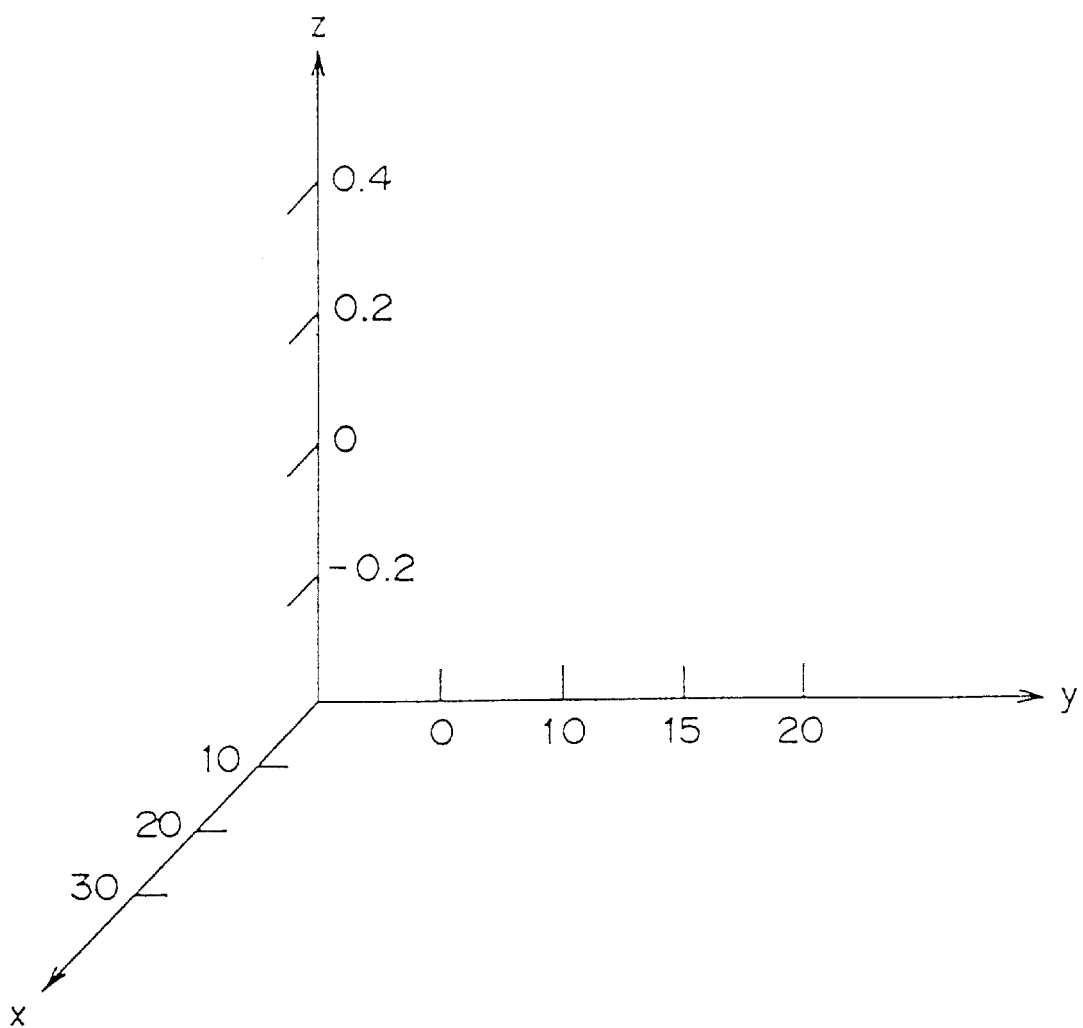
FIG. 1 exemplifies a display of coordinate axes and scales in a conventional three-dimensional graphic displaying system.

For example, each of the scale marks corresponding to the x axis are represented by only one line existing on the x-y plane in FIG. 1, which shows the conventional system. According to the first embodiment, scale mark data is generated by adding one line to, for example, the z-x plane, as a combination of two or more lines which are not located on an identical line. With this operation, the scale marks of the z-x plane are properly displayed even if the x axis is seen from, for example, a direction perpendicular to the x-z plane, that is, the direction of the y axis. Therefore, the problem that positions of scale marks cannot be identified depending on a viewpoint direction is overcome, according to the first embodiment.

In the first embodiment, an angle formed by scale marks as two lines, may normally be an arbitrary angle. If two scale marks are made perpendicular to each other, and each of the scale marks is made parallel to one of the axes other than that on which the scale marks are made, the direction from which a displayed portion is seen can be identified, even if the other axes disappear from the display area due to expansion of the region of a certain scale mark on the axis.

Figure 10:
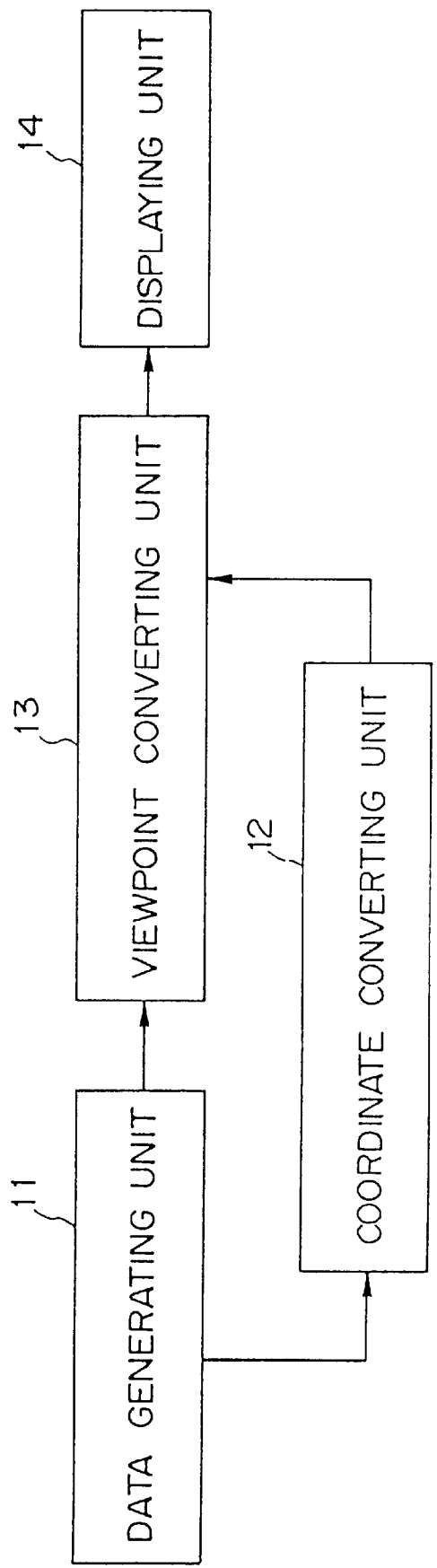
FIG. 10 is a functional block diagram showing a three-dimensional graphic displaying system according to the present invention.

FIG. 10 is a functional block diagram showing the configuration of a three-dimensional graphic displaying system according to the present invention. In this figure, a data generating unit 11 is intended to generate data of axes and scale marks, data of an arrow as an arrow standard of a vector display graphic, and data of other graphics, as a set of three-dimensional coordinates (x, y, and z). A coordinate converting unit 12 is intended to perform coordinate conversion of the standard arrow graphic, in order to generate an arrow representing a vector having an actual direction, position, and size, by using the arrow which serves as the standard of a vector generated by the data generating unit 11.

A viewpoint converting unit 13 is intended to perform coordinate conversion for converting data, generated by the data generating unit 11 and/or a vector display arrow graphic having actual direction, position, and length, as the result of the coordinate-conversion performed by the coordinate converting unit 12, into data in a coordinate system which varies depending on a position of a user viewpoint. A display graphic is rotated, moved, expanded, or reduced by this unit. A displaying unit 14 is intended to two-dimensionalize graphic data after being converted by the viewpoint converting unit 13, process it into data which can be displayed on a computer display, and display the result.

Figure 11:
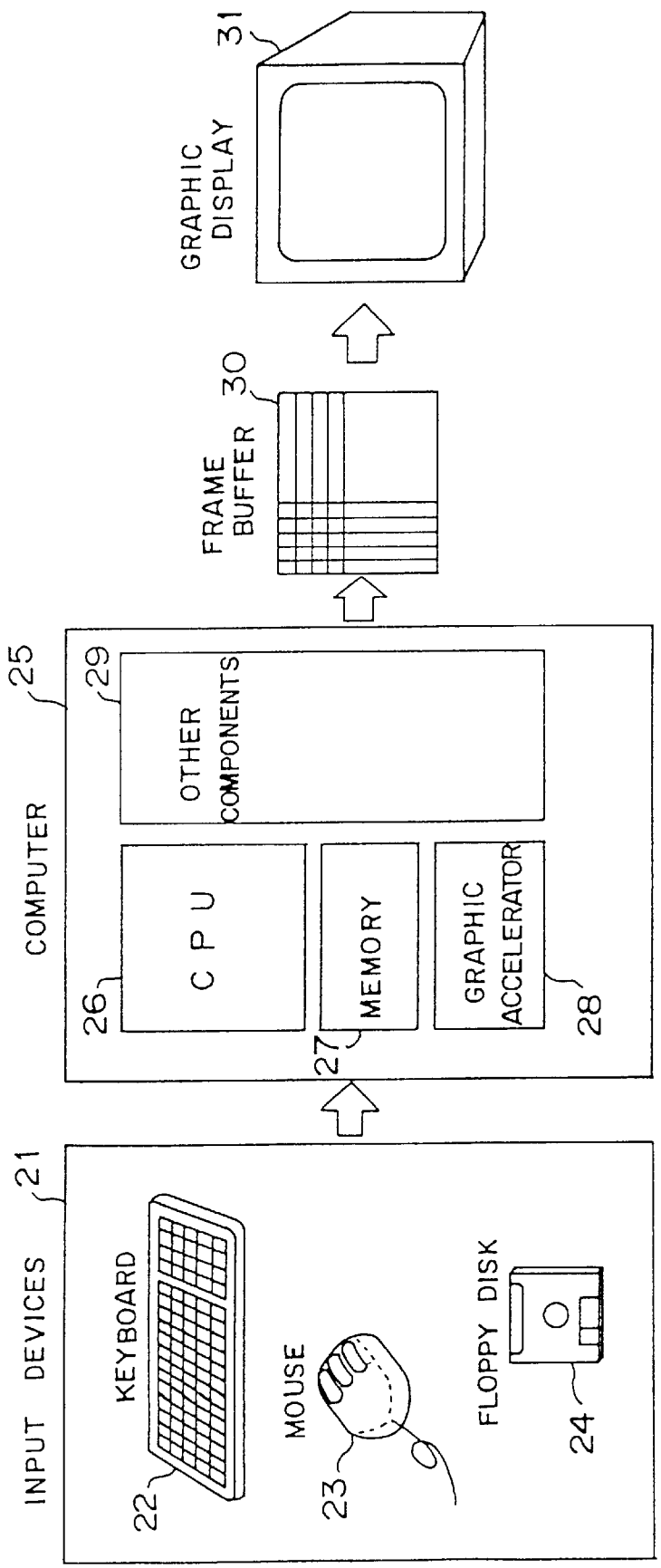
FIG. 11 is a block diagram showing the configuration of the three-dimensional graphic displaying system according to the present invention, when used in a computer environment.

FIG. 11 is a functional block diagram showing the configuration of the three-dimensional graphic displaying system for implementing the capabilities of the respective units shown in FIG. 10, in a computer environment. In this figure, the system includes input devices 21, computer 25, frame buffer 30 for storing display data generated by the computer, and a graphic display 31 for displaying data stored in the frame buffer 30.

The capability of the data generating unit 11 shown in FIG. 10 is implemented by transmitting required data from the input devices 21, such as a keyboard 22, mouse 23, or a floppy disk 24, to the computer 25, and generating data of a three-dimensional graphic in a CPU 26. The generated data is stored in a memory 27 included in the computer 25.

The capability of the coordinate converting unit 12 is implemented by performing a coordinate conversion process for three-dimensional graphic data requiring the coordinate conversion, such as vector display data, by the CPU 26.

The capability of the viewpoint converting unit 13 is implemented by transmitting viewpoint data from the input devices 21, such as the keyboard 22, mouse 23, or the floppy disk 24, to the computer 25, and generating three-dimensional graphic data whose viewpoint is changed, by the CPU 26.

The capability of the displaying unit 14 is implemented by transmitting the three-dimensional graphic data generated by the capability of the viewpoint converting unit 13, which is converted into data for the frame buffer 30 corresponding to the graphic display 31, to the graphic display 31.

If the computer 25 is equipped with a device dedicated to a graphic display, such as a graphic accelerator 28, data for the frame buffer can quickly be generated.

Figure 12:
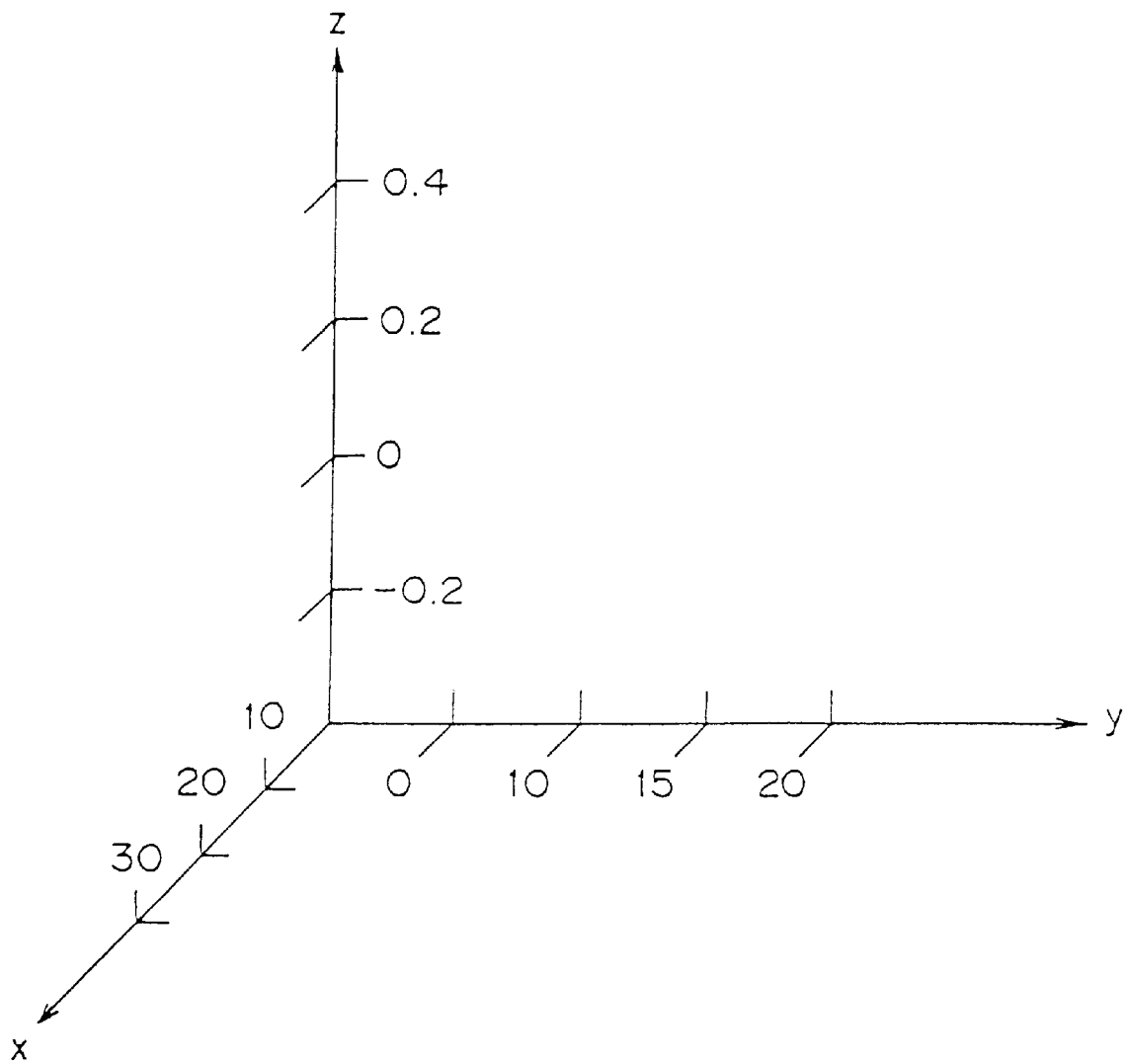
FIG. 12 exemplifies a display of scales; according to a first embodiment.
Figure 13:
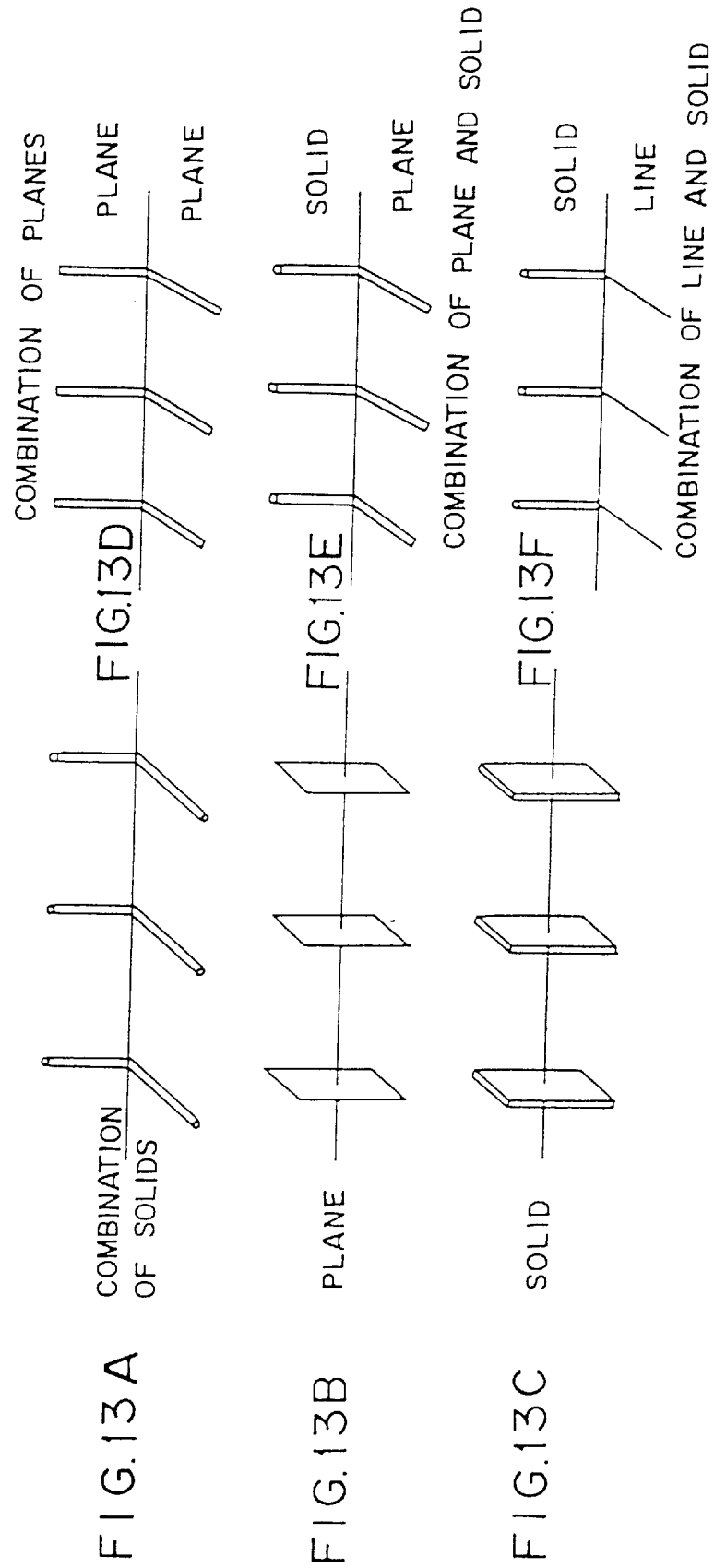
FIGS. 13A to 13F show other examples of displays of scale marks according to the first embodiment.

FIG. 12 is a schematic diagram explaining a method for displaying scale marks, according to the first embodiment of the present invention. In this figure, each of the scale marks is displayed as a combination of two lines which exist on a plane perpendicular to each of the axes, and are not located on an identical straight line. By way of example, scale marks for the z axis are put on the z-x and y-z planes, which are perpendicular to the z axis.

FIGS. 13A to 13F show other examples of the scale mark displaying method according to the first embodiment. As shown in this figure, scale marks can be displayed not only as a combination of two lines, but as various forms such as solid bodies, planes, and a combination of solid bodies, respectively shown in FIGS. 13A through 13C, or a combination of planes shown in FIG. 13D, a combination of a plane and a solid body shown in FIG. 13B, and a combination of a line and a solid body shown in FIG. 13F.

Figure 14:
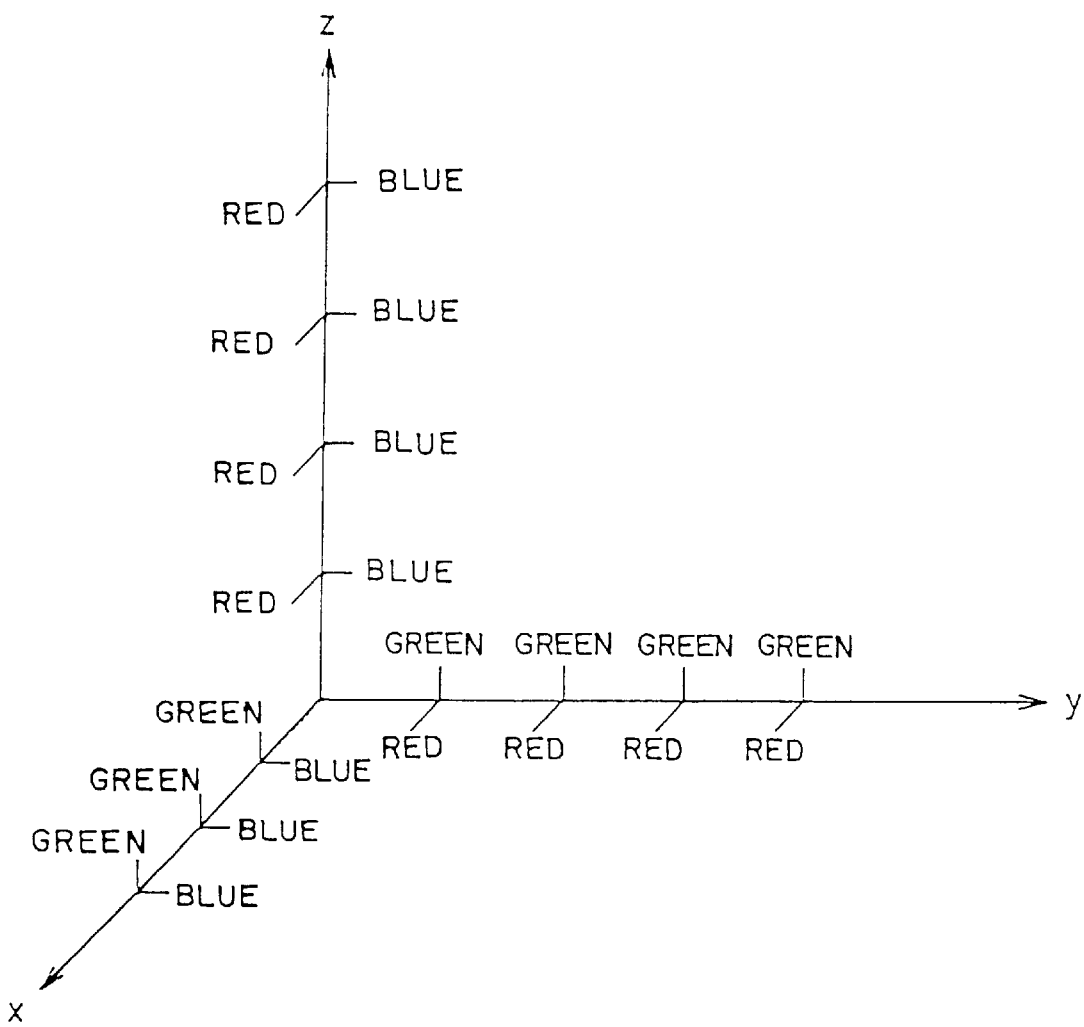
FIG. 14 is a schematic diagram explaining a distinction of scale marks according to the first embodiment.

FIG. 14 is a schematic diagram explaining the scale mark displaying method which enables a direction from which a display area is seen to be identified, even if a portion of a coordinate axis disappears from the display area. In this figure, each of the scale marks is displayed as a combination of two lines which are perpendicular to each other, and exist on a plane perpendicular to each of the axes and are not located on an identical straight line, in a similar manner as in FIG. 12, and which plane each line exists on is determined by colors. By way of example, the scale marks on the x-y plane are represented by a blue color, while the scale marks on the z-x plane are represented by a green color, for the x axis.

FIGS. 15A through 15C show examples in which not colors of two lines, but types or thicknesses of the lines, and shapes of the graphics are changed to make a distinction. These figures show the examples in which the scale marks parallel to the y axis among the scale marks on the x axis are drawn only in a range where the value of the y is positive, and the scale marks parallel to the z axis are drawn only in a range where the value of the z is positive. FIG. 15D shows the example in which two lines are used as the scale marks. Unlike FIG. 14, this figure shows the example in which the scale marks are drawn only in a range where the values of variables corresponding to the coordinates are negative.

Figure 16:
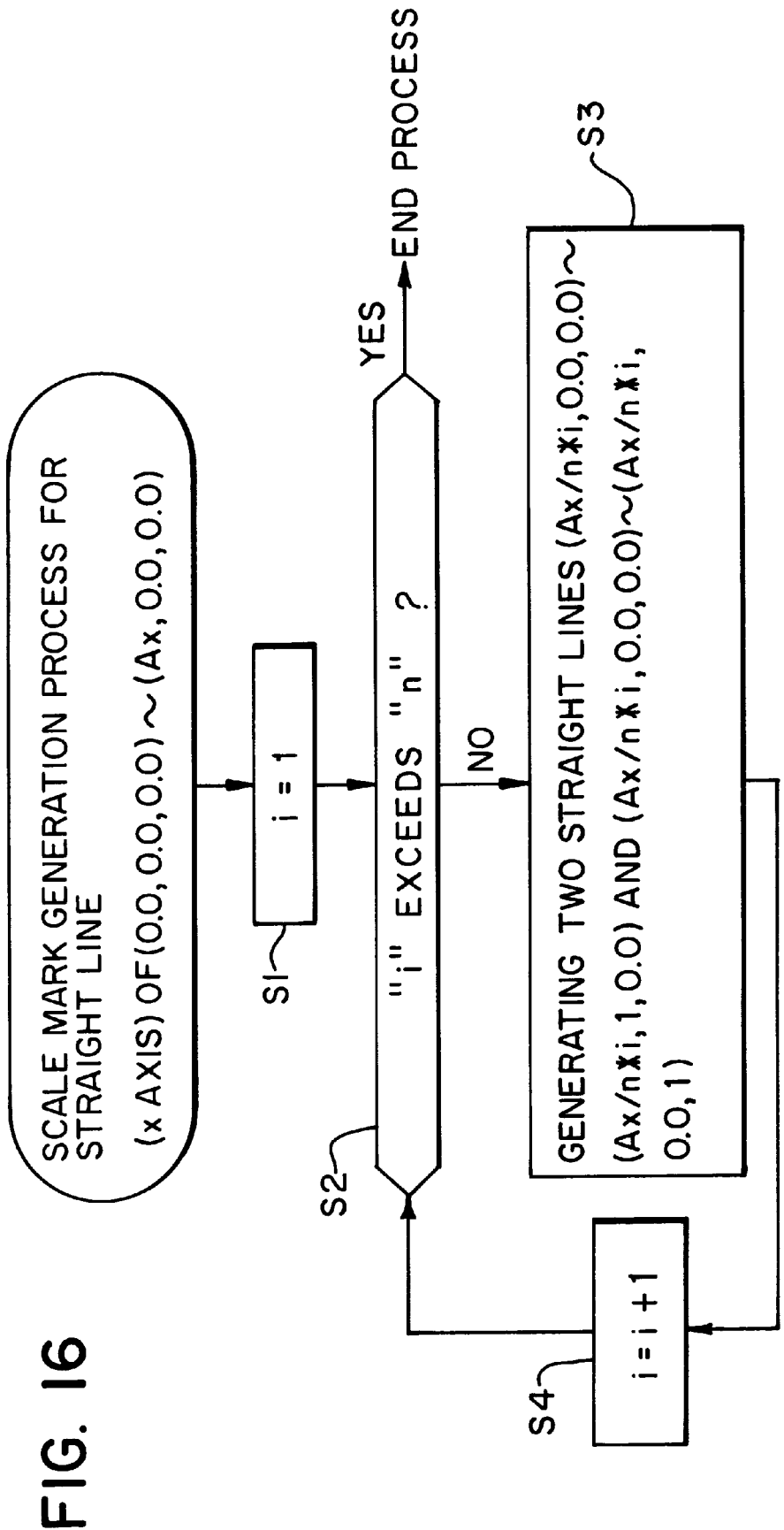
FIG. 16 is a flowchart showing a process for generating the scale marks, according to the first embodiment.

FIG. 16 is a flowchart showing a process for generating scale marks on an x axis, according to the first embodiment. In this figure, "n" scale marks are put between an origin and a point Ax on the x axis, and two lines are attached to the axis as each of the scale marks.

First of all, the value of a variable "i" corresponding to each of the scale marks is initiated to "1" in step S1. Then, it is determined whether or not the value of the variable "i" exceeds the number of scale marks to be generated "n" in step S2. If "NO", two lines which possess a length with the value "1", parallel to the y axis, and the length with the value "1", parallel to the z axis, are attached to a point (Ax/n)i, in step S3.

Thereafter the value of the variable "i" is incremented in step S4, and the process goes back to step S2 where it is determined if the value of the variable "i" exceeds "n". If "NO", the process in and after step S3 is repeated. When it is determined that the value of the variable "i" exceeds "n", that is, two lines have been attached to each of the "n" scale marks in step S2, the process is terminated.

The process shown in FIG. 16 is performed by the data generating unit 11 shown in FIG. 10. The data generating unit 11 generates scale marks for the y and z axes in a similar manner. If the scale marks are classified by color as shown in FIG. 14, color data are added. Since the first embodiment does not employ a vector graphic, there is no need to perform the process of the coordinate converting unit 12.

Then, the process of the viewpoint converting unit 13 is performed. The data of coordinate axes and scale marks, which are generated by the data generating unit 11, are converted into a coordinate system which varies depending on a user viewpoint. This process is fundamentally called viewing conversion, which assumes that an origin "O" is located near the center of an object. This is because the coordinate axes and their scale marks are seen from a viewpoint (the position of an observers eyes) E toward the origin "O" of a world coordinate system.

The direction of a vector $\overrightarrow{EO}$ is the direction of a sightline in which the origin "O" is viewed from the viewpoint E, and we need to obtain the screen coordinate (x, y) of the object, that is, x and y coordinate on a screen, which are perpendicular to the sightline direction $\overrightarrow{EO}$. The viewpoint coordinate system is used to obtain the screen coordinate. The x and y axes of the viewpoint coordinate system are perpendicular to the sightline direction $\overrightarrow{EO}$, while the z axis is parallel to the sightline direction $\overrightarrow{EO}$. The origin at this time is the viewpoint E.

To obtain a viewpoint coordinate of an arbitrary point represented by the world coordinate system, the viewing conversion using a viewing matrix is performed, and a screen coordinate is obtained by using the result of the conversion. The details of the above described process are included in the following document.

C Graphics Technique pp. 79–86 written by L. Ammeraal, and translated by Ikeno, et al.

published by Ohm Co.(1993)

Lastly, the process of the displaying unit 14 is performed. The data of the coordinate axes and their scale marks are orthogonally projected to be two-dimensionalized, and displayed on a computer display.

Figure 17:
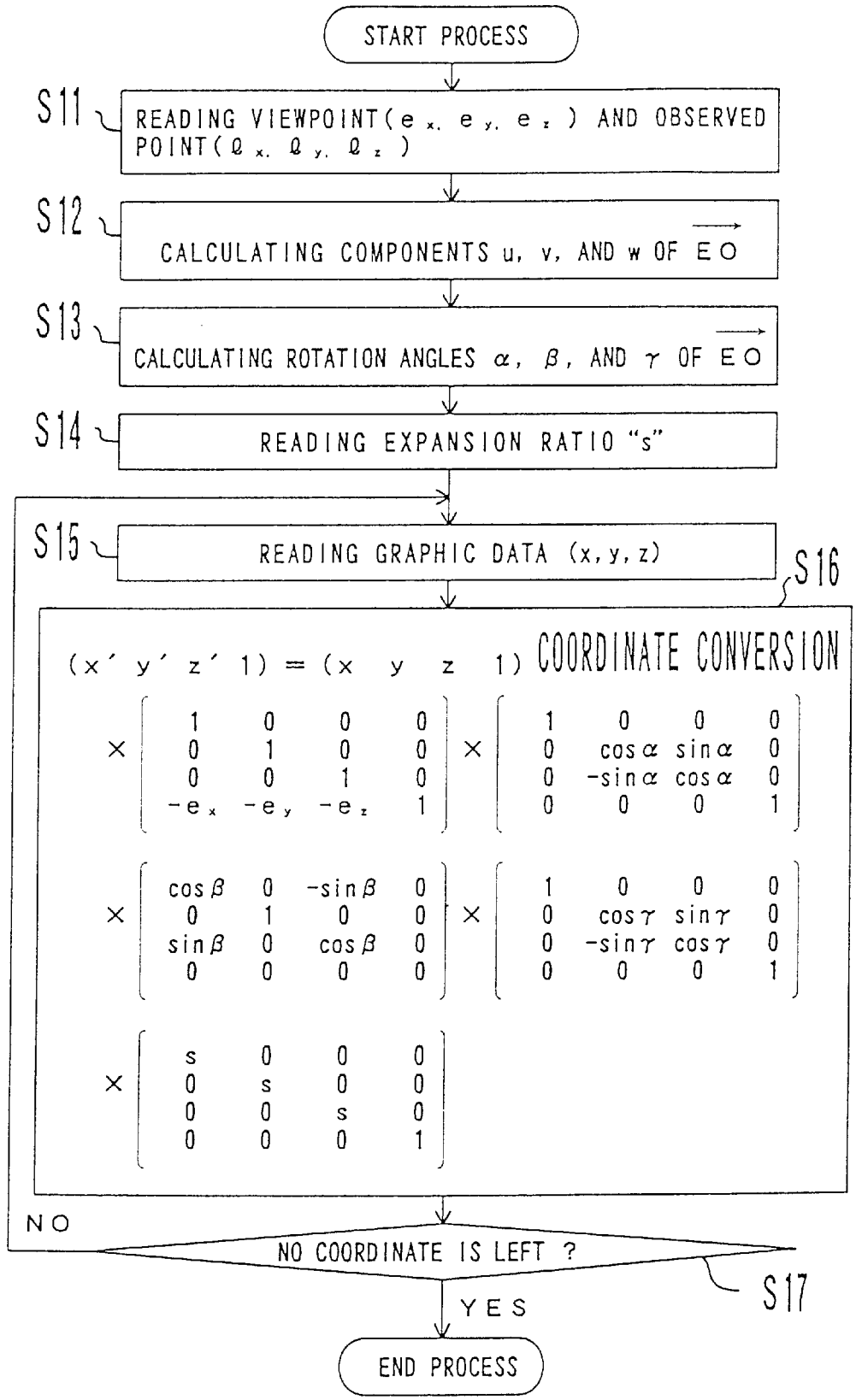
FIG. 17 is a flowchart showing details of a viewpoint conversion process, according to the first embodiment.

Provided next is the explanation about the details of the process performed by the viewpoint converting unit 13, by using the flowchart shown in FIG. 17. Once the process is started in this figure, the coordinates of a viewpoint and an observed point are read in step S11.

Figure 18:
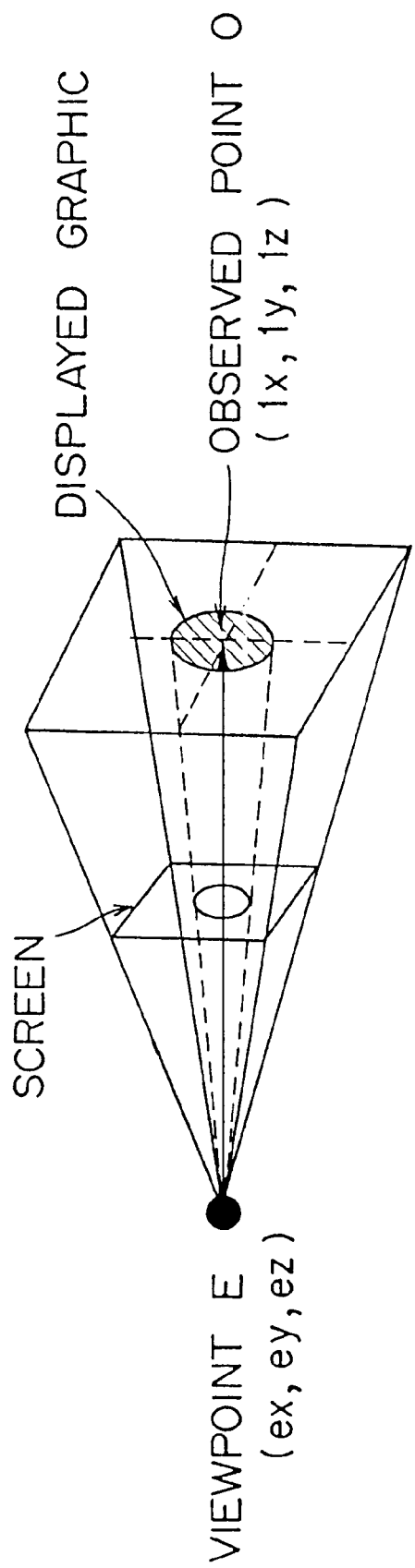
FIG. 18 is a schematic diagram explaining a relationship between a viewpoint and an observed point, in a viewpoint converting process.

FIG. 18 is a schematic diagram explaining the relationship between the viewpoint and the observed point, in the viewpoint converting process. In this figure, the coordinate of the viewpoint E is $(e_x, e_y, e_z)$, while the coordinate of the observed point O is $(l_x, l_y, l_z)$. The vector of the sightline direction in which the observed point O is seen from the viewpoint E is the vector $\overrightarrow{EO}$. A screen is arranged between the viewpoint and the observed point, and the position at which a displayed graphic is projected on the screen, when seen from the viewpoint, is defined as a screen coordinate.

The observed point is, so to speak, the focal point of a viewfinder of a camera which is looked through. The object of the viewpoint converting process is to calculate the distance from the center to each of coordinate points of the displayed graphic data, in x and y directions, based on the assumption that the focal point is the center of the screen. With this process, from which coordinate point to which coordinate point a line must be drawn, can be determined. That is, the central point of the entire graphic to be displayed may be considered as the observed point.

Each of the components u, v, and w of the vector $\overrightarrow{EO}$ are obtained by the following equations, in step S12 of FIG. 17.

$$u=e_x-l_x, \ v=e_y-l_y, \ w=e_z-l_z$$

Next, rotation angles α, β, and γ for each of the x, y, and z axes are calculated by the following equations, in order to make the sightline vector $\overrightarrow{EO}$ match the direction of the z axis in step S13 of FIG. 17.

$$\alpha = -\frac{\pi}{2}, \ \beta = \tan^{-1}(u/v)$$

$$\gamma = \tan^{-1}\left(w/\sqrt{u^2+v^2}\right)$$

Figure 19B:
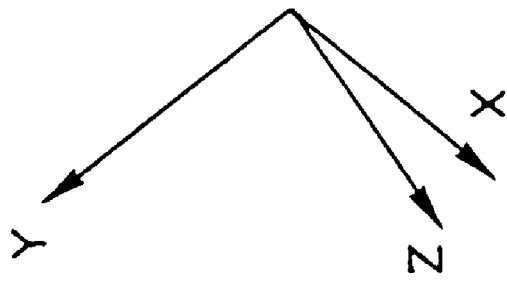
FIGS. 19A to 19B is a schematic diagram explaining rotation around coordinate axes.
Figure 19A:
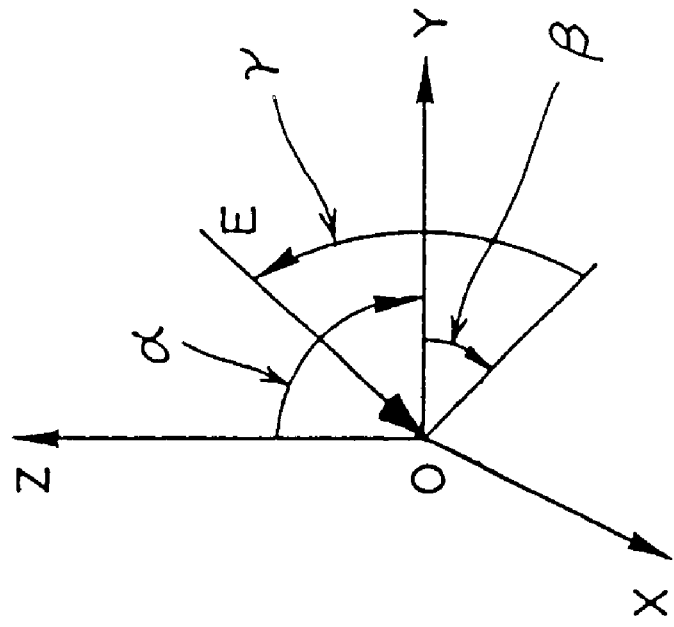

FIGS. 19A to 19B is a schematic diagram for explaining the rotation about each of the axes in order to match the direction of the sightline vector $\overrightarrow{EO}$ and that of the z axis, that is, for explaining the rotation of the vector EC and the other axes when one axis is a rotation axis. After the coordinate conversion for moving the origin "O" to the viewpoint "E" is first performed, as will be described later. The sightline vector $\overrightarrow{EO}$ and the other axes are rotated about the x axis by the degree of rotation $$\alpha = -\frac{\pi}{2}$$

(the rotation direction indicated by the arrow represents the right direction of the rotation angle). This rotation makes the direction of the z axis identical to the original negative direction of the y axis. Then, the direction of the z axis can be made identical to the direction of the vector $\overrightarrow{EO}$ in the coordinate system whose origin is the viewpoint "E", by rotating the other axes and the sightline vector $\overrightarrow{EO}$ about the y axis by the degree of rotation β, and about the z axis by the degree of rotation γ. FIG. 19(B) shows the directions of the coordinate axes after the rotation about each of the axes, and the x and y axes exist on a plane perpendicular to the direction of the sightline vector $\overrightarrow{EO}$.

In step S14 of FIG. 17, the expansion ratio "s" is read. Expansion is made, for example, by making a viewpoint close to an observed point, or enlarging a displayed graphic. With this process, expansion is implemented by enlarging the displayed graphic. The expansion rate is designated, for example, by a user, as a value that is a multiple or a fraction of the original graphic to be displayed.

Then, data of the graphic to be displayed, that is each coordinate point, is read in step S15, and the calculation process for coordinate conversion is performed in step S16. The process is terminated when it is determined that no coordinate point to be converted is left in step S17.

With the calculation performed in step S16, the six matrices are multiplied. The first matrix, that is, the leftmost matrix of this multiplication is a matrix with one row and four columns whose fourth column element is "1". The first to third column elements of the first matrix are the coordinates x, y, and z of the original graphic data to be converted. The second matrix is a matrix for moving the origin to the viewpoint "E". The third matrix is a matrix for representing the rotation by the degree α when the rotation axis is the x axis. The fourth matrix is a matrix for representing the rotation by the degree β when the rotation axis is the y axis. The fifth matrix is a matrix for representing the rotation by the degree γ when the rotation axis is z axis. The sixth matrix is a matrix for representing the expansion of a graphic. The coordinates x', y', and z' after being converted are obtained as the result of the multiplication of these six matrices. Note that the element of the fourth column of the matrix with one row and four columns which is obtained as the result of the multiplication of the six matrices always results in "1". This value, however, has :no meaning in the viewpoint converting process.

Notice that the following C language program is referenced to implement the above described viewpoint converting process.

Solaris XGL 3.0.2 Programmer's Guide

C language program on Page 248 provided by SunSoft

Additionally, equations (3.13) and (3.14) on page.69, and equation (3.15) on page 70 of the above described "C Graphics Technique" are referenced for the matrices for representing rotations.

Figure 2:
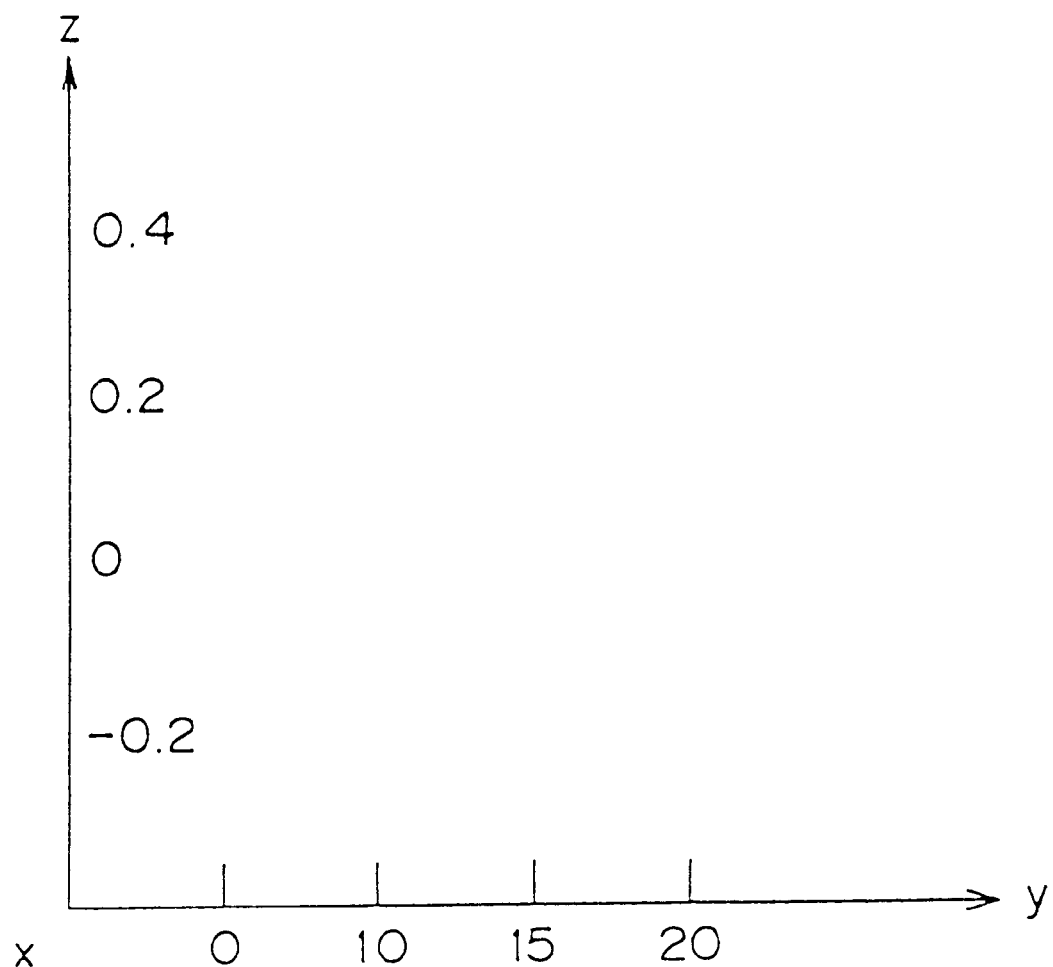
FIG. 2 is a schematic diagram showing a display state of the coordinate axes shown in FIG. 1, which are seen from a direction perpendicular to a y-z plane.
Figure 3:
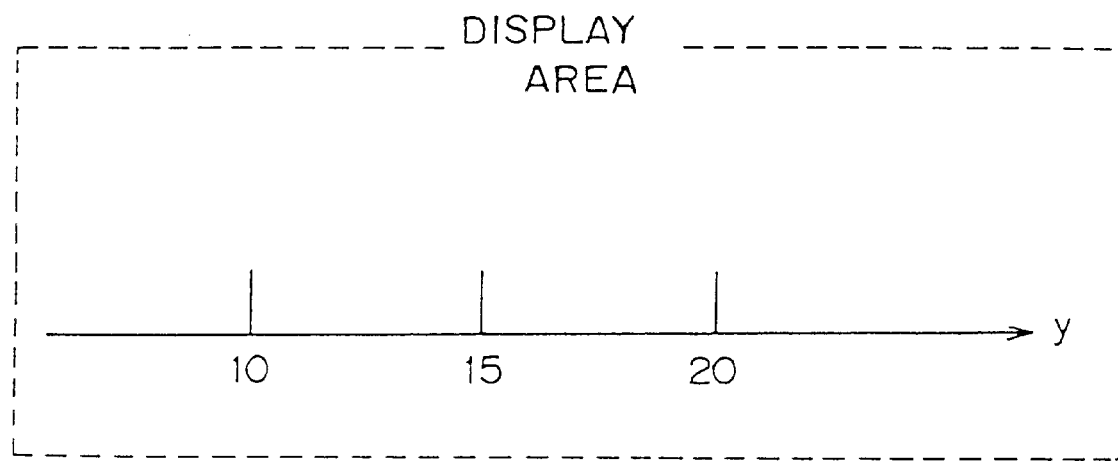
FIG. 3 exemplifies a display state of a conventional three-dimensional graphic displaying system, when two coordinate axes are outside a display area.
Figure 20:
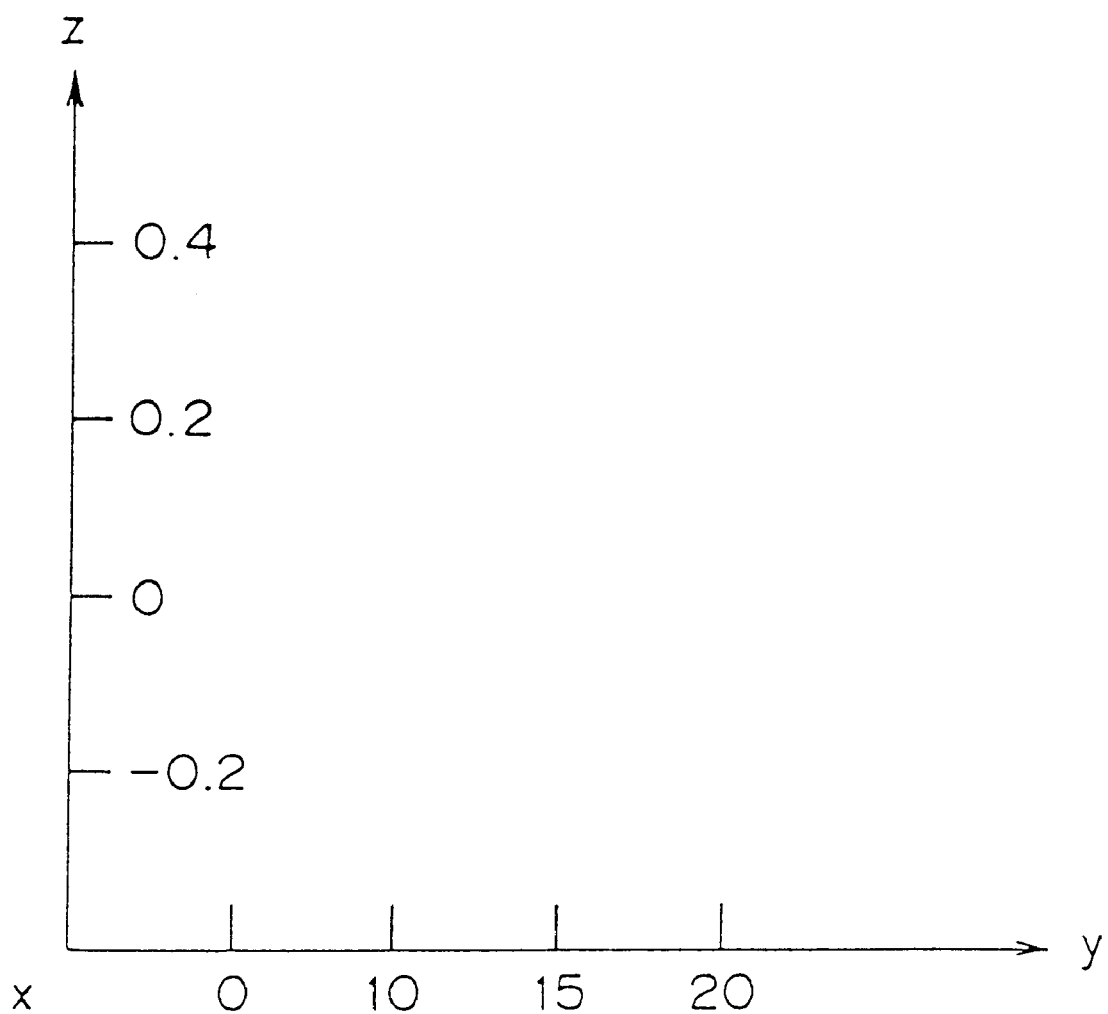
FIG. 20 exemplifies a display state of coordinate axes and scale marks, according to the present invention.

FIGS. 20 and 21 are schematic diagrams explaining the effect of the first embodiment. FIG. 20 shows the scale marks which are shown in FIG. 12, and seen from the direction perpendicular to the y-z plane, that is, in the direction of the x axis, in a similar manner as in FIG. 2 corresponding to FIG. 1. Compared with FIG. 2, the scale marks on the z axis are clearly displayed. Similarly, the scale marks on the x axis seen from the direction perpendicular to the z-x plane, and the scale marks on the y axis seen from the direction perpendicular to the x-y plane can clearly be displayed, by using the displaying method shown in FIG. 12. With this method, a display similar to that of a conventional two-axis graph can be made, when the scale marks are seen from the direction of each of the axes.

FIG. 21 exemplifies the case in which a portion of the scale marks on a y axis is expanded and displayed. In this figure, the x and z axes disappear from a display area. However, since the y axis is part of FIG. 14, the direction from which a user observes the display area can be identified. In this figure, it can easily be determined that the user observes the display area obliquely from the upper right. That is, the scale marks not only indicate positions, but also suggest the direction of the sightline.

As described above in detail, scale marks on a coordinate axis can always be identified, whichever direction a viewpoint is changed to. Therefore, this facilitates identification when seeing a graph from an arbitrary viewpoint.

Provided next is the explanation about the second embodiment of the present invention. The second embodiment aims at overcoming the above described third and fourth problems. That is, the objects of this embodiment are to overcome the problem that the distinction between start and end points cannot be definitely made when a viewpoint is changed, and to allow identification of the direction from which a vector graphic is seen, even if a coordinate axis disappears from a display area due to expansion of only the region of the vector display graphic.

In the second embodiment, the data generating apparatus 1 shown in FIG. 9 is intended to generate vector display data, by attaching three or more lines which do not exist on an identical plane, and are shorter than a length equivalent to the length of a vector to be displayed, to the start or the end point of the vector, in order to display the vector.

The displaying apparatus 2 is intended to display the vector display graphic in correspondence with a viewpoint position, using the vector display data generated by the data generating apparatus 1.

Figure 4:
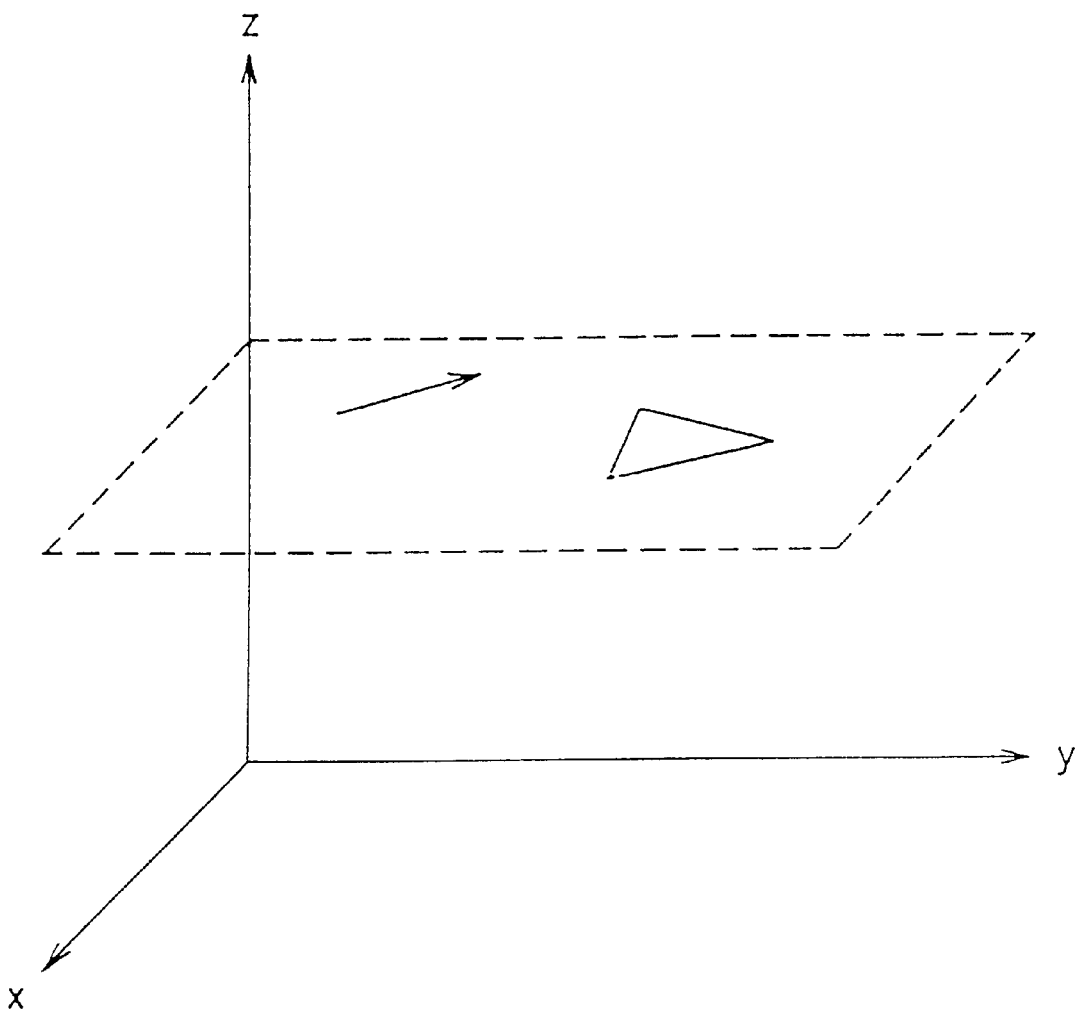
FIG. 4 exemplifies a vector display in the conventional three-dimensional graphic displaying system.

That is, this embodiment employs an arrow having three or more branches instead of an arrow composed of one trunk and two branches, which is explained by referring to FIG. 4 showing the conventional display example. As a result, the distinction between the start and end points of a vector can be made at any time by using lines which do not exist on an identical plane as three branches, even if a viewpoint exists on a plane including two of the three branches. This is because the remaining one branch does not overlap the trunk, and one or more branches are able to be displayed.

Furthermore, the direction from which the vector is seen can be identified, for example, by making three branches parallel to respective coordinate axes, even if only the display area of the vector is expanded and the coordinate axes disappear from the display area, according to the second embodiment.

Figure 22A:
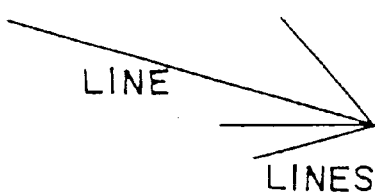
FIGS. 22A to 22F are schematic diagrams showing examples of vector graphic displays according to a second embodiment.
Figure 22D:
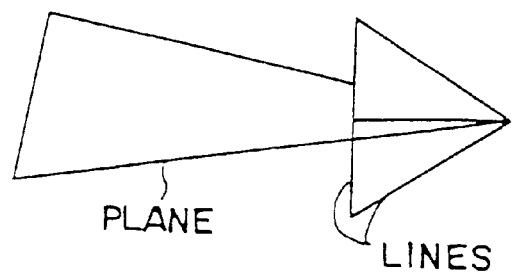
Figure 22B:
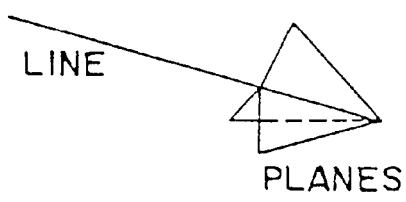
Figure 22E:
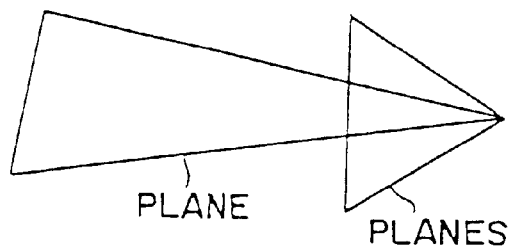
Figure 22C:
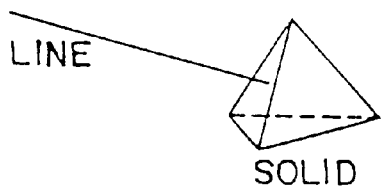
Figure 22F:
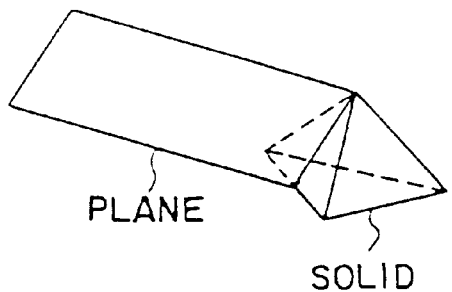

FIGS. 22A to 22C exemplify displays of vector graphics in the second embodiment. These figures show examples of branches such as a combination of lines shown in FIG. 22A, combination of planes shown in FIG. 22B, and a solid shown in FIG. 22C, when a trunk of the vector is displayed as a line. It also shows the examples of branches such as a combination of lines shown in FIG. 22D, combination of planes shown in FIG. 22E, and a solid shown in FIG. 22F, when the trunk is displayed not as a line, but as a plane of a two-dimensional polygon.

FIGS. 23A to 23C exemplify displays of vector graphics by attaching lines or branch graphics parallel to respective coordinate axes, at a start or an end point of a vector, in the second embodiment. In FIGS. 23A and 23B, a red line indicating an x direction, a green line indicating a y direction, and a blue line indicating a z direction are attached to the start or the end point of each of the vectors. FIG. 23C shows the example in which a square pillar indicating the x direction, a cylinder indicating the y direction, and a line indicating the z direction are attached, as an example of changing branch graphics.

Additionally, a vector display graphic may be generated, for example, by attaching lines classified by color, or lines parallel to the respective axes, with the value of coordinates corresponding to a parallel axis not included in a positive range, but in a negative range, as described by referring to FIG. 15D.

Figure 24:
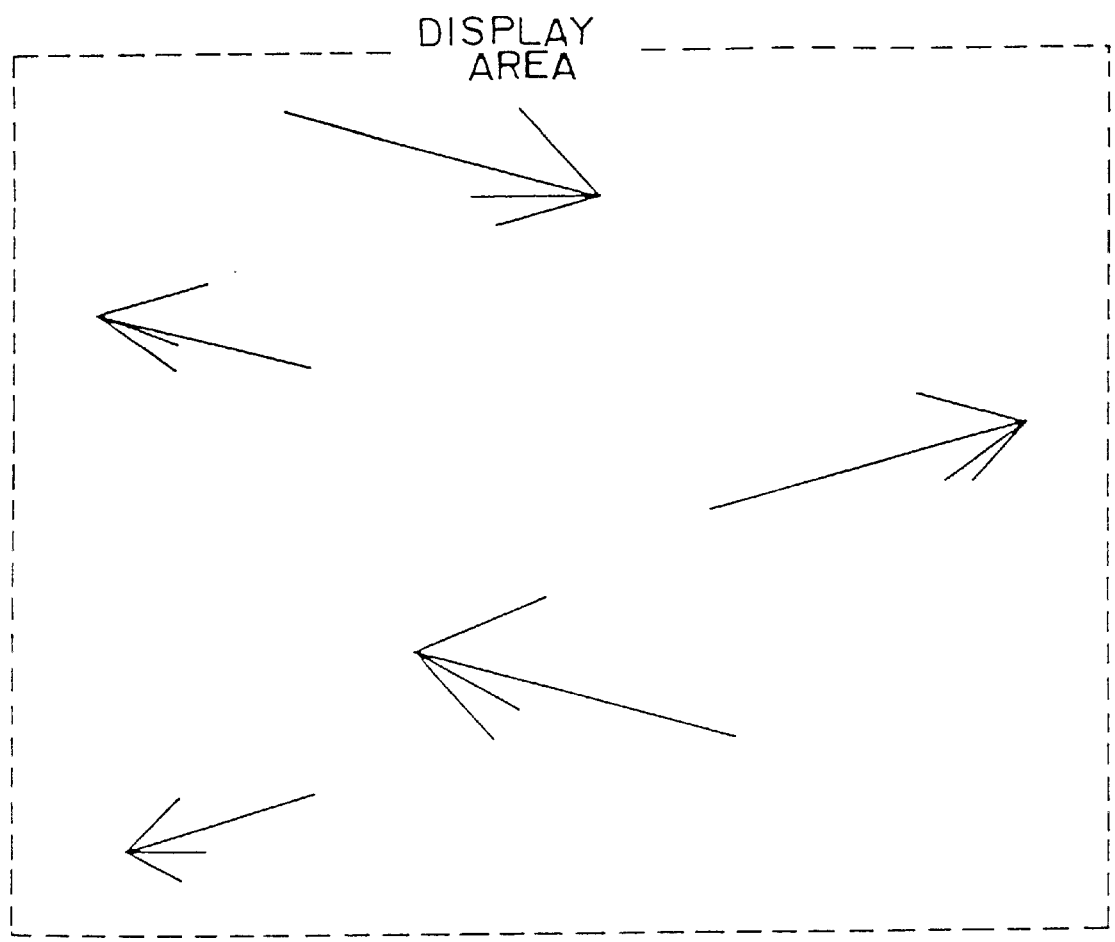
FIG. 24 exemplifies a display of a plurality of vector graphics, according to the second embodiment.

Furthermore, the second embodiment can be applied to the case in which not one vector but a plurality of vectors are displayed. FIG. 24 shows such a display example. As described above, the distinction between start and end points of each of a plurality of vectors can be made from any viewpoint direction, by using three lines which do not exist on an identical plane as branches, also when a plurality of vectors are displayed.

Figure 25:
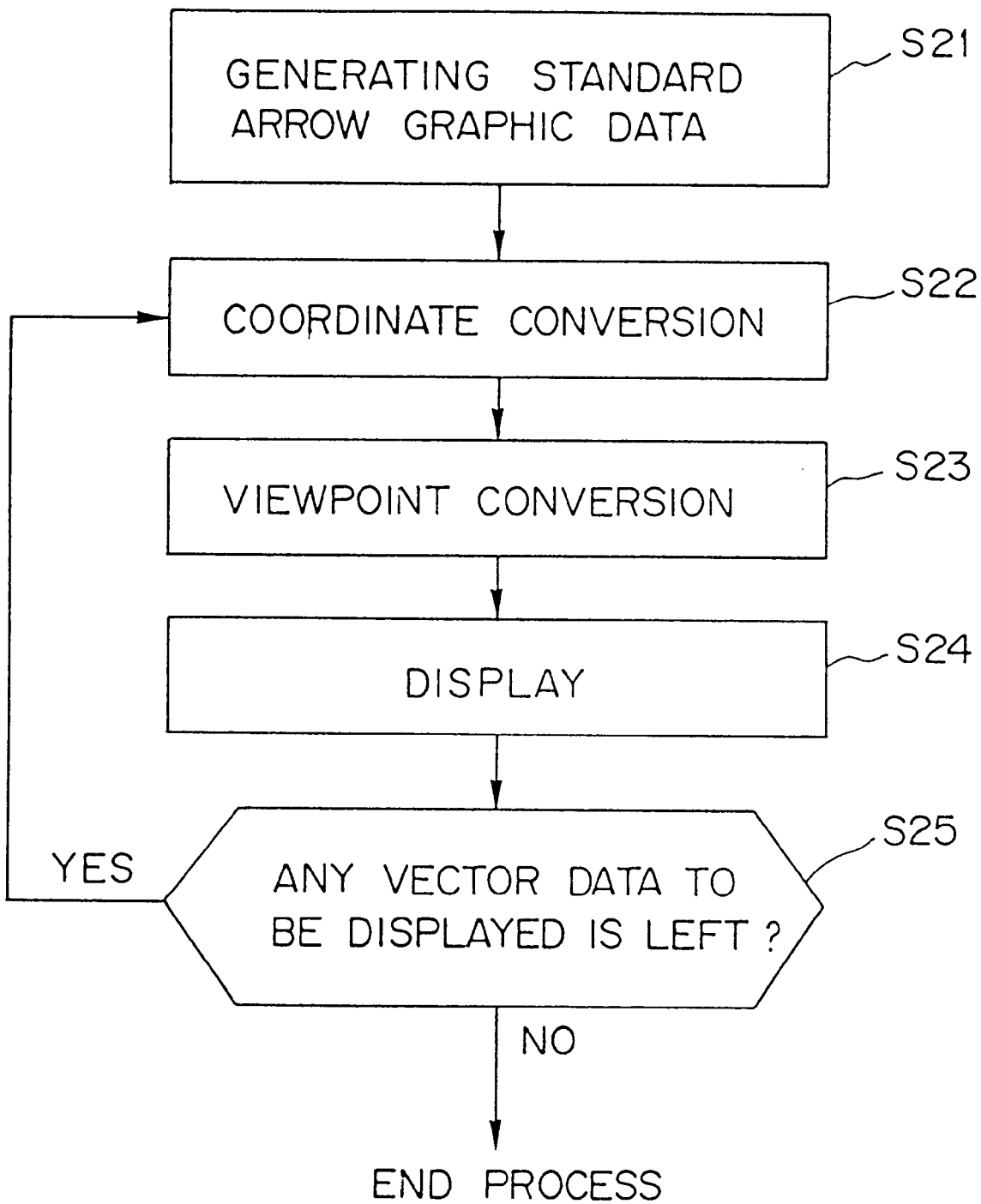
FIG. 25 is a flowchart showing a vector graphic display process, according to the second embodiment.

FIG. 25 is a flowchart showing a vector graphic display process according to the second embodiment. In this figure, standard arrow graphic data is first generated in step S21. The explanation about the standard arrow graphic data is provided below, by referring to FIG. 26.

FIG. 26 shows an example of the standard arrow graphic generated by the data generating unit 11. It shows a standard vector arrow graphic whose three branches do not exist on an identical plane, and are attached to the trunk. Although the branches are not parallel to the directions of coordinate taxes in this figure, also a standard arrow graphic whose branches are made parallel to the directions of the coordinate axes can be generated as the set of such coordinate points. When the branches are classified by color in correspondence with the direction of each of the axes and displayed, the data indicating the colors are added when the standard arrow graphic is generated.

In step S22 of FIG. 25, a coordinate conversion process is performed. In this process, an arrow graphic is generated as an actual vector, by being provided the coordinates (x, y, z) of the start point, length, and the direction of a vector, that is, the components of the vector (u, v, w), in correspondence with a standard arrow graphic. The substantial content of the coordinate conversion process includes move and rotation operations performed in a three-dimensional space. Pages 67–74 of the above described document include the details of the coordinate conversion process, including a move of a point when a coordinate system is converted, a rotation about an arbitrary point of an arbitrary line passing through the origin, and a rotation regarding a vector starting from an arbitrary point.

C Graphics Technique pp. 67–74

Provided below is the explanation about further details of the coordinate conversion process performed in step S22, by referring to FIG. 27.

Figure 27:
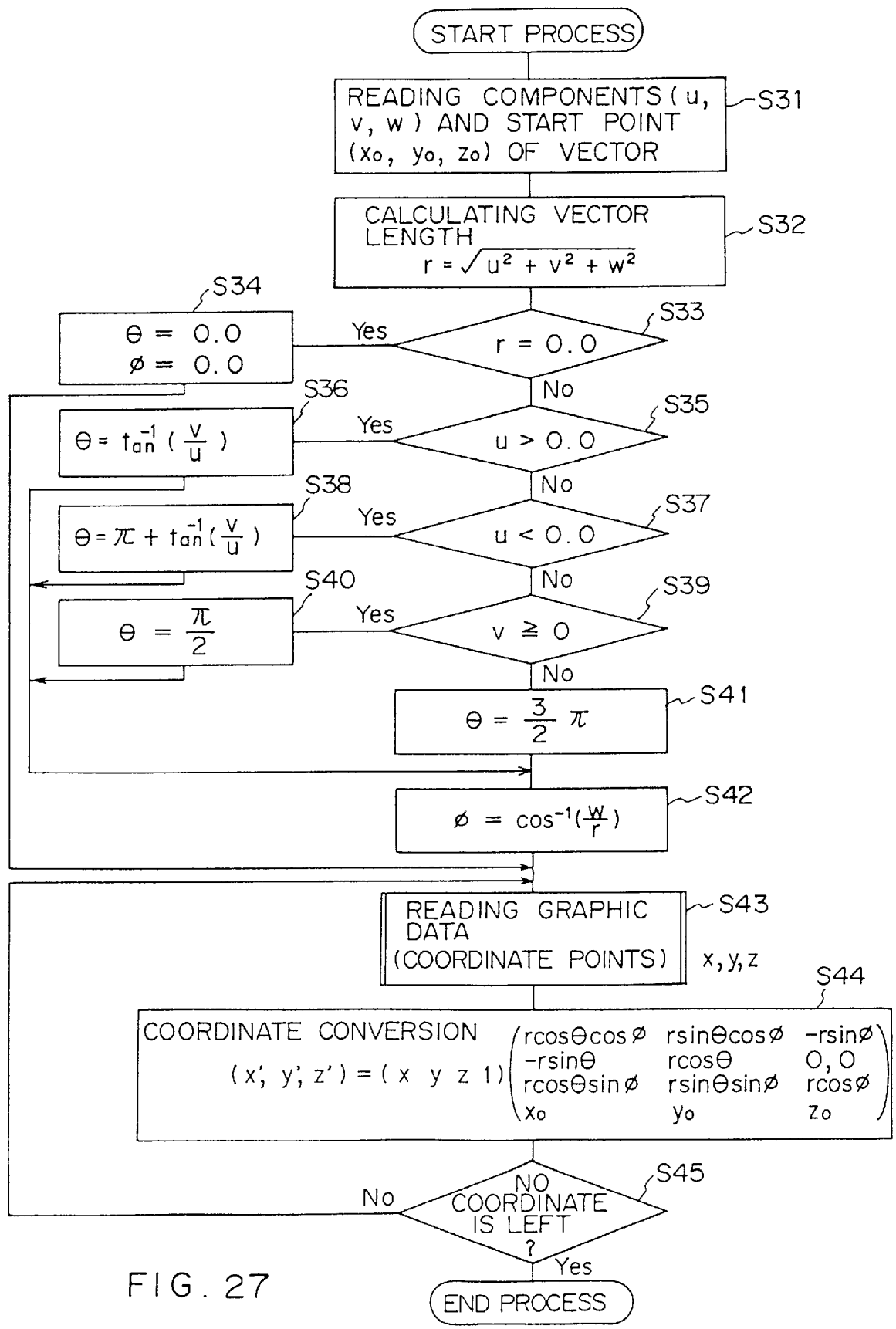
FIG. 27 is a flowchart showing details of a coordinate conversion process, according to the second embodiment.

Once the process is started in the flowchart of FIG. 27, the components of the vector (u, v, w), and the coordinates ($x_0$, $y_0$, $z_0$) of the start point of the vector, are read in step S31. Then, the length of the vector is obtained in step S32. It is determined whether or not the length is "0" in step S33. If "YES", both of the angles θ and φ are set to "0" degrees in step S34. Then, the process skips to step S43. Here, the angle θ is an angle formed by the vector orthogonally projected onto the x-y plane and the x axis, while the angle φ is an angle formed by the vector and the z axis.

If the length of the vector is not "0" in step S33, it is determined whether or not the x component of the vector, that is, "u", is positive in step S35. If "YES", the angle θ is obtained according to the following equation in step S36, and the process then skips to step S42.

$$\theta = \tan^{-1}\frac{v}{u}$$

If the x component of the vector "u" is not positive in step S35, it is determined whether or not that value is negative, in step S37. If "YES", the value of angle θ is obtained according to the following equation in step S38. Then, the process skips to step S42.

$$\theta = \pi + \tan^{-1}\frac{v}{u}$$

If it is determined that the value of "u" is not negative in step S37, it is determined whether or not the y component "v" is positive ("0" or greater) in step S39. If this condition is satisfied, the value of angle θ is set to π/2 in step S40. Then, the 2 process skips to step S42.

If it is determined that the y component of the vector "v" is not positive in step S39, the value of θ is set to $$\frac{3\pi}{2}$$

in step S41. Then, the process goes to step S42.

In step S42, the angle φ is obtained according to the following equation, in all of the cases in which the length of the vector is not θ.

$$\phi = \cos^{-1}\frac{w}{r}$$

Then, graphic data, the coordinates (x, y, z) of the start and end points of the vector, and that of the end point of each of its branches, as shown in FIG. 26, are read in step S43. Next, the coordinate conversion process for these coordinates is performed in step S44. As a result of the process, coordinates (x', y', z') are obtained. Note that in step S44 of FIG. 27 the fourth column element of the first matrix on the right side is the numeral "1". The 1st through 3rd rows contained in the right matrix with 4 rows and 3 columns on the right side include the elements for a rotation operation, and the fourth row includes the elements for moving the start point of the vector. The numeral "1" as the fourth column element of the first matrix is required to include the element for the move operation in the coordinate conversion.

In step S45, it is determined whether or not any coordinate is left to be converted. If "NO", the process in and after step S43 is repeated. For example, if the standard arrow graphic of the vector shown in FIG. 26 is converted, the process in steps S43 and S44 is repeated for the total of 5 coordinates including the coordinates of the start and end points of the vector, and end points of its branches. Then, the coordinate conversion process is terminated. The expressions used in this flowchart are included in the portion from p.71 to the fifth line of page 72 of the above described document "C Graphics Technique".

Next, a viewpoint conversion process is performed in step S23 of FIG. 25. By taking advantage of the arrow graphic data for which the coordinate conversion is performed by the coordinate converting unit 12, the data is converted into data for the coordinate system which varies depending on a viewpoint position. This process is performed in exactly the same manner as in the first embodiment.

Then, a display process is performed in step S24. In this process, the arrow graphic data as the result of the process performed by the viewpoint converting unit 13, is orthogonally projected to be two-dimensionalized. A process for displaying the resultant data on a computer display is then performed.

It is determined whether or not any vector data is left to be displayed, in step S25 of FIG. 25. If "YES", the processes in and after step S22 are repeated. In this coordinate conversion process, the standard arrow graphic data generated in step S21 is always used, and an arrow graphic for displaying an actual vector is newly generated based on the standard arrow graphic data. The processes shown in steps S22 through S24 are repeated the number of times corresponding to the number of vectors to be displayed. When it is determined that no vector data is left in step S25, the process is terminated.

Figure 5A:
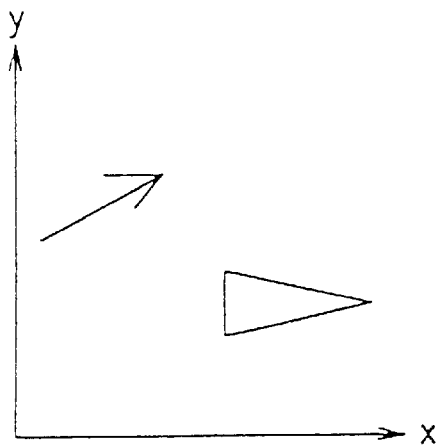
FIGS. 5A to 5C are schematic diagrams showing display states of the vector display graphic of FIG. 4 seen from various directions.
Figure 5B:
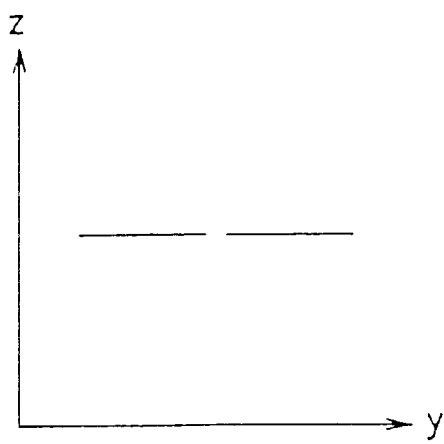
Figure 5C:
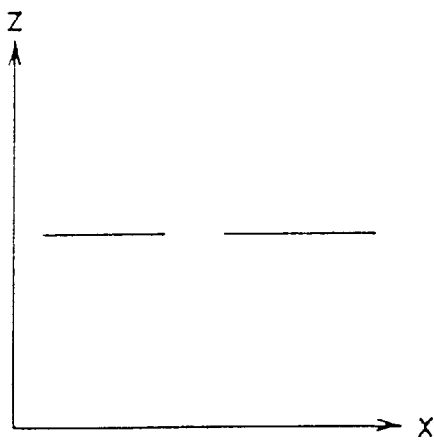
Figure 6:
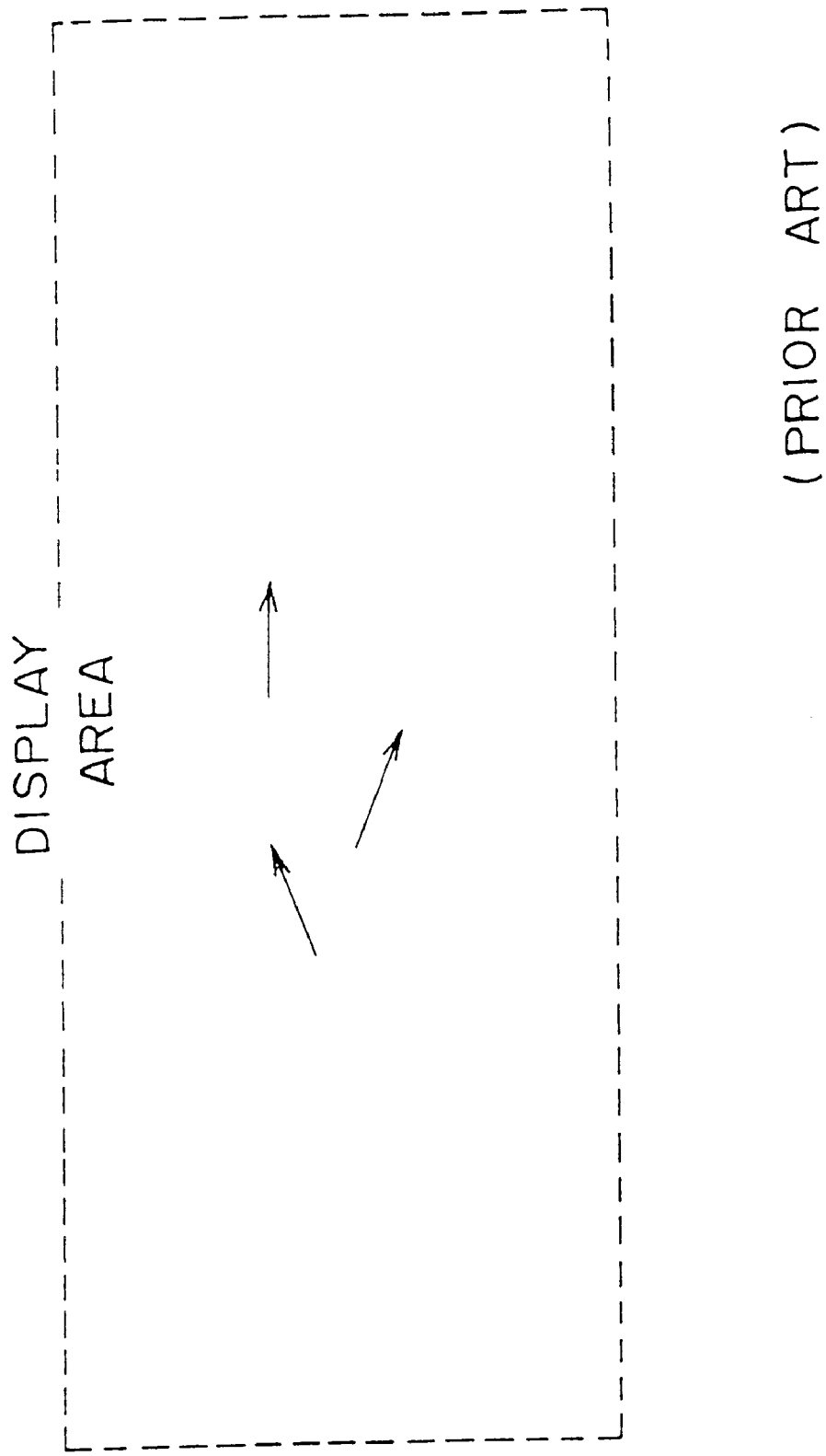
FIG. 6 exemplifies a display of a vector graphic when three coordinate axes are outside a display area, in the conventional three-dimensional graphic displaying system.
Figure 28A:
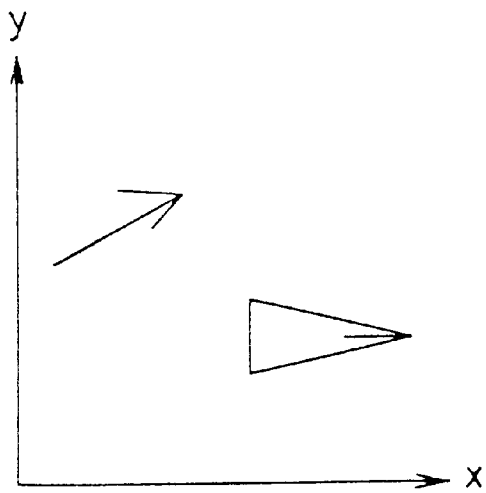
FIGS. 28A to 28C are schematic diagrams showing results of displaying a vector graphic, according to the second embodiment.
Figure 28B:
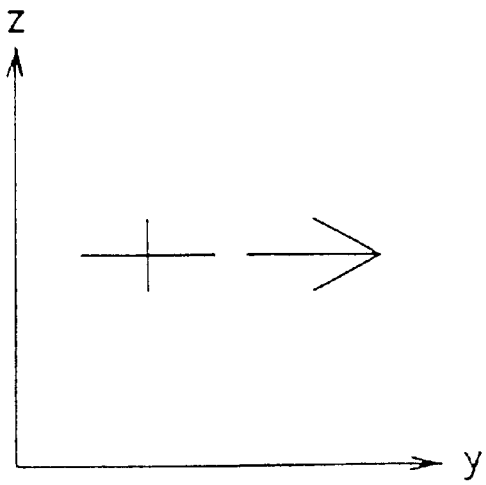
Figure 28C:
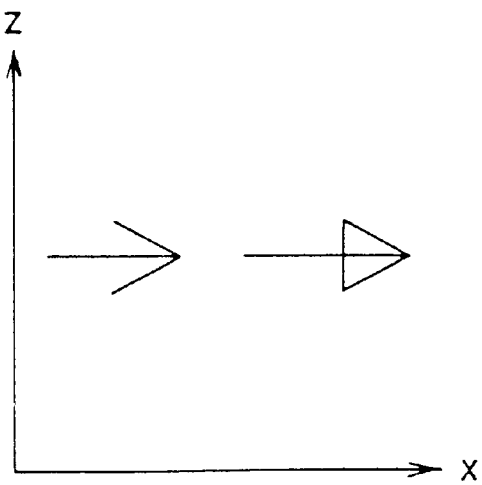

Provided next is the explanation about: the effect of the second embodiment. FIGS. 28A to 28C show the display states in which the graphics shown in FIG. 22A and 22D are seen from each direction. Unlike FIG. 5 corresponding to FIG. 4 showing the conventional display examples, the start and end points are distinctly shown. That is, the state of the vector can be identified even if it is rotated, etc., and the vector can be seen from an arbitrary viewpoint. Additionally, use of a wire frame representation allows faster drawing than that using other representation methods.

In the display state of the y-z plane shown in FIG. 28B, the arrow on the right shows the display state of the graphic shown in FIG. 22A, that is, the display state of the vector whose trunk is implemented as a line. One of the three branches over the trunk in FIG. 22 becomes invisible because another branch hides it, while the other two branches under the trunk are visible. The display state on the left side corresponds to the result of the displayed graphic whose trunk is implemented as a two-dimensional triangle shown in FIG. 22D. FIG. 28B exhibits the display state of the vector graphic seen from the direction perpendicular to the y axis, from a viewpoint whose x coordinate is large in the display state of FIG. 28A.

Figure 29:
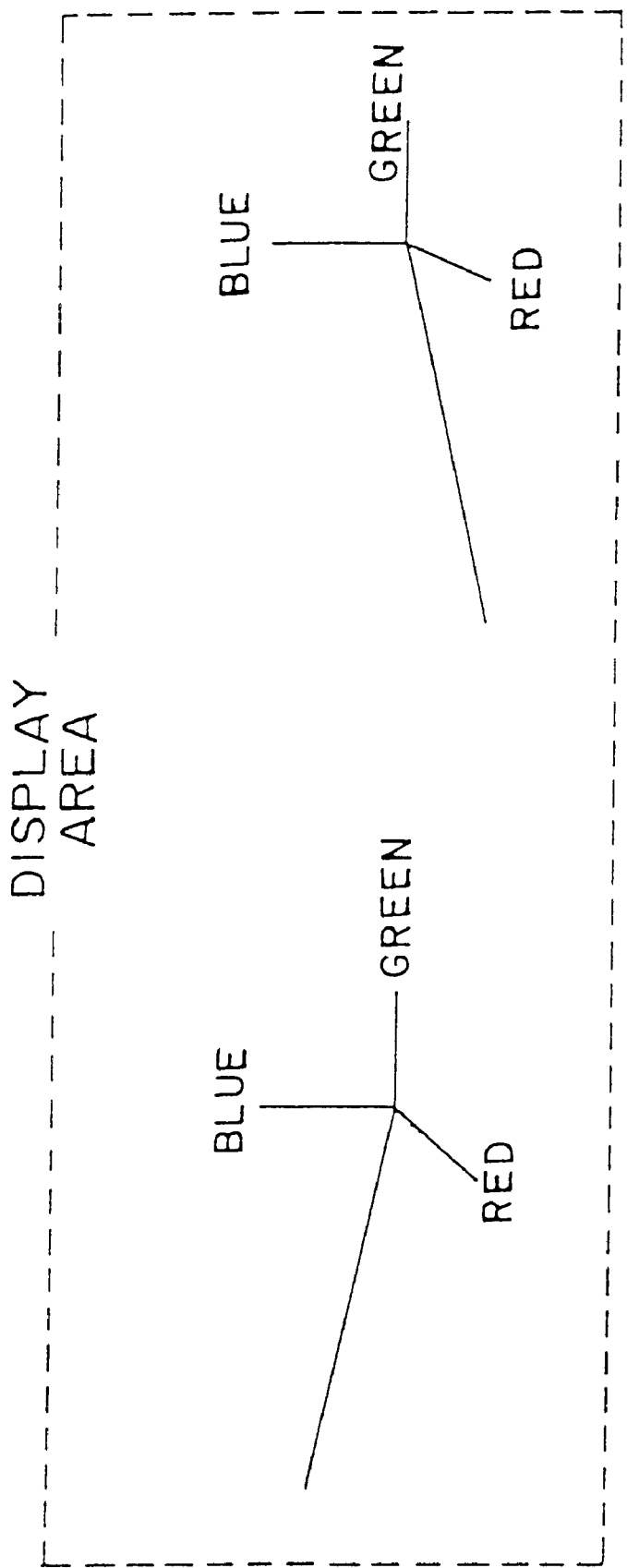
FIG. 29 exemplifies a vector graphic in the case in which three coordinate axes are outside a display area, according to the second embodiment.

FIG. 29 shows the state in which three coordinate axes disappear from a display area, in the case in which branches parallel to the respective directions of the three coordinate axes are attached to the start or the end point of a vector, according to the second embodiment. In this display state, the direction from which a user sees the vector can be identified. That is, the branches of the vector not only indicate the start or the end point of the vector, but also suggest the direction of the sightline.

According to the second embodiment as described above, the start and end points of a vector graphic can be identified whichever direction a viewpoint is changed to, and a physical phenomenon represented by the vector can easily be identified. Additionally, the use of the wire frame representation allows a faster drawing than that implemented by other representation methods.

Provided last is the explanation about a third embodiment of the present invention. The third embodiment aims at overcoming the above described fifth problem. That is, the third embodiment aims at allowing an object included in a solid body as a target to be identified, and to be displayed in a three-dimensional graphic displaying system for allowing a user viewpoint to change, for example, when an unremoved surface of the solid body exists between the object included in the solid body to be displayed and the viewpoint.

In the third embodiment, the data generating apparatus 1 shown in FIG. 9 is intended to generate data for displaying each surface of an object in order to display the object, the above described solid body in this case, and at the same time, the direction in which each surface is seen from an arbitrary point inside the object is determined as the right direction for each surface data.

The displaying apparatus 2 determines whether or not each surface is the right direction when seen from a certain viewpoint, in correspondence with the position of the viewpoint in order to display the object, and displays only a surface whose direction is determined to be right, on a display. With these operations, a displayed object, the internal state of the solid body in this case, can be identified from whichever direction of a user viewpoint.

That is, the problem referred to in the explanation of FIG. 8 is overcome according to the third embodiment. Since the left surface which hides part of the internal cube is not the right direction from the viewpoint direction in this figure, this surface is not displayed. Conversely, the right surface, that is, the surface which is not displayed in FIG. 7, is displayed, because it becomes the right direction from the viewpoint. As a result, the included cube can be clearly identified.

FIG. 30 exemplifies a display of the internal state of the solid body in the third embodiment. This figure shows the example of the display result when a viewpoint is changed in the display state of FIG. 7 referred to in the conventional example. Unlike FIG. 8, the left surface of the solid body is removed, while the right surface is displayed in this figure. As a result, the internal state of the solid body can definitely be identified.

Figure 31:
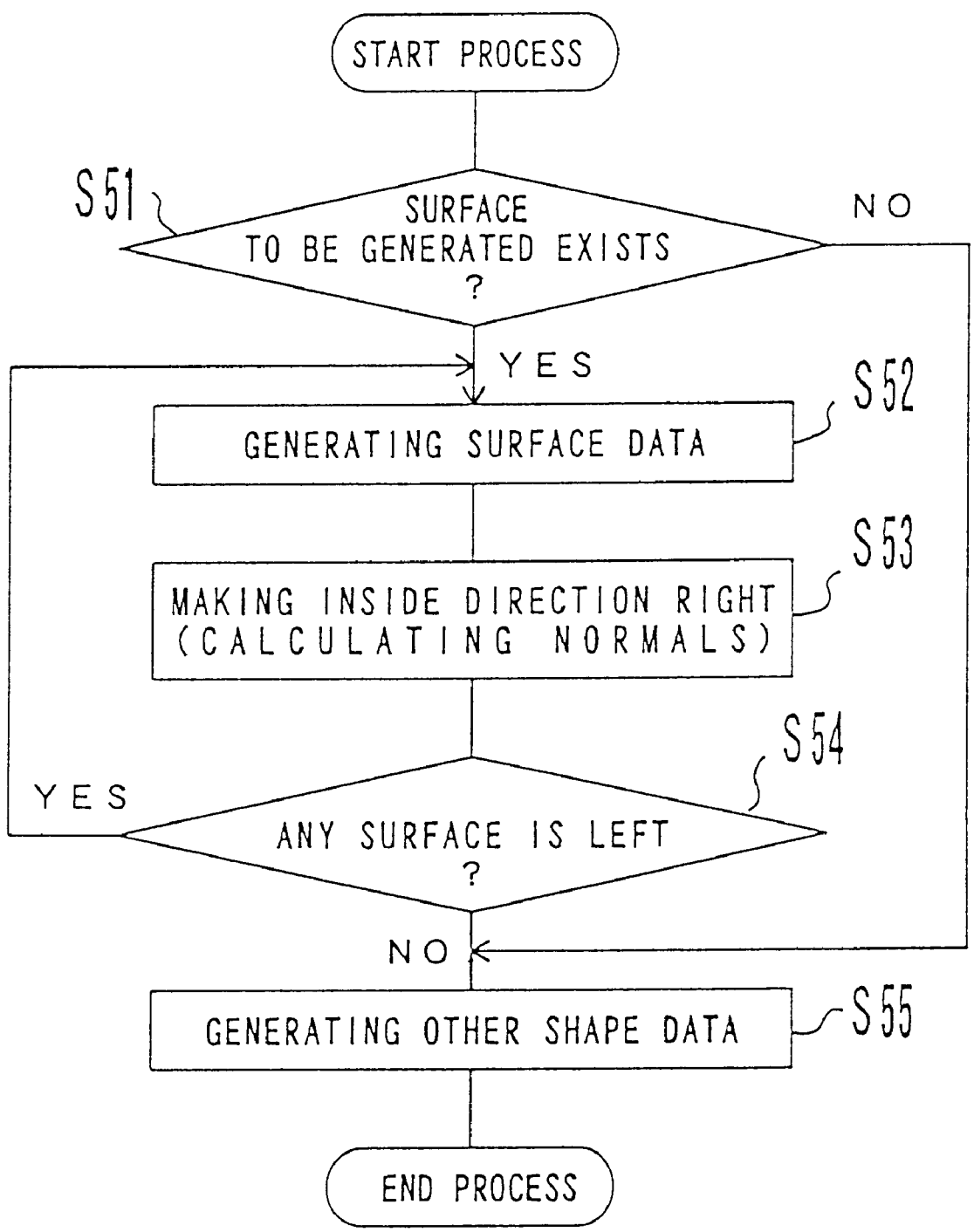
FIG. 31 is a flowchart showing a process performed by a data generating unit, according to the third embodiment.

FIG. 31 is a flowchart showing the process performed by the data generating unit 11 in the third embodiment. Once the process is started in this figure, it is determined whether or not there is any surface, for which data must be generated in step S51. Here, a surface, for which data must be generated is a surface which is not a reverse side from the viewpoint. That is, the surfaces, for which data must be generated in FIG. 30 are the upper, left, and front surfaces when seen from a viewpoint. The (explanation about the right and reverse sides of a surface is provided below, by referring to FIG. 32.

Figure 32:
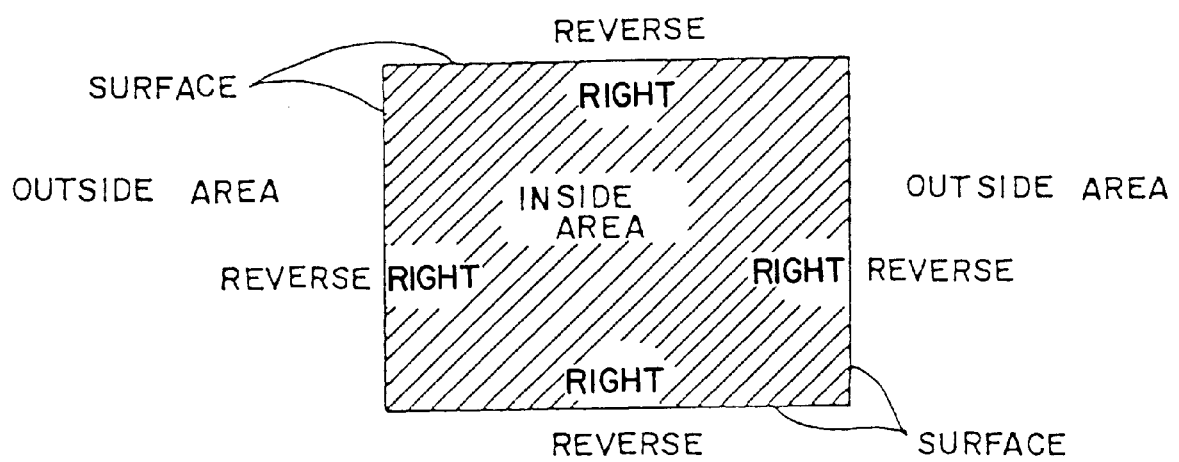
FIG. 32 is a schematic diagram explaining right and reverse directions of a surface.

FIG. 32 is a schematic diagram explaining a method for determining the right and reverse sides of a certain surface. Assuming that the inside of the solid body shown in FIG. 30 is one area, the side facing the inside of the area is determined to be in the right direction, while the side facing the outside of the area is determined to be in the reverse direction. That is, the direction toward the inside of the area is determined to be the right direction.

In FIG. 31, if it is determined that there is any surface for which data must be generated in step S51, the data for that surface is generated in step S52. Then, normal line data is provided to perform calculation, and the inside direction is determined to be the right side. With this normal line calculation, a vector perpendicular to a polygon (one of surfaces of a polyhedron), which directs to the outside of the polyhedron, is obtained as a normal line vector.

For a polygon (pentagon) having five vertices: (1) the five vertices are linked in a counterclockwise direction, and five vectors (corresponding to the five sides) are generated; (2) two contiguous vectors among them are selected; and (3) an outer product (vector product) of the two selected vectors is calculated to obtain a normal line vector. The typical expression for this calculation is included in the following document. Note that the determination of the right and reverse sides of a surface is made in a similar manner as in the process performed by the displaying unit, which will be described later.

Practical Graphics
pp. 55–56
written by Yoshio Sato
published by ASCII (1986)

After the process of step S53 is completed, it is determined whether or not any surface for which data must be generated is left in step S54. If "YES", the process in and after step S52 is repeated. If "NO" in step S51, or no surface for which data must be generated is determined to be left in step S54, the other shape data such as data of another graphic to be displayed in the inside of the solid body, etc. are generated in step S55, and the process is terminated.

Since a vector graphic is not displayed in the third embodiment, the process of the coordinate converting unit 12 shown in FIG. 10 is not performed. The process by the viewpoint converting unit 13 is performed in a similar manner as in the first embodiment. The process by the displaying unit 14 starts from the determination of the right and reverse sides, in order to determine which surfaces to display depending on the direction of a viewpoint.

With this determination process, normal line vectors for a polygon are obtained in a similar manner as in the normal line calculation process performed by the data generating unit 11 in step S53, and it is determined whether or not the normal line vectors are oriented toward the direction of a sightline. That is, if an inner product (scalar product) of a normal vector N and a sightline vector V(unit vector of the sightline direction) N·V is positive, a corresponding surface is determined to be the right direction. If the inner product is negative, the corresponding surface is determined to be the reverse direction. Pages 56–58 of the above described document "Practical Graphics" refer to the details of this process as a specific example.

The displaying unit 14 two-dimensionalizes only the data for a surface which is determined to be in the right direction, and displays the resultant data on a computer display. Note that the entire data are redrawn when a viewpoint is changed, and the existence/non-existence of the necessity for the data to be displayed is determined. There is only one data for a surface which is determined to be either right or reverse, and the existence/non-existence of the necessity of the display of that data is determined.

FIG. 33 shows another example of the method for displaying the inside of the solid body in the third embodiment. For a surface between a viewpoint and the inside of the solid body, that is, for a surface determined to be in the reverse direction, only its frame is displayed to allow the inside of the solid body to be identified.

FIG. 34 shows a further example of the method for displaying the inside of the solid body according to the third embodiment. In this figure, the display is performed so that additional objects are displayed inside of the solid body.

FIGS. 35A to 35D shows the display states in which the inside of the solid body is seen from various directions, by using the displaying method according to the third embodiment. With the method according to the third embodiment as described above, an inside of a solid body or an included object can be identified from whichever direction the solid body is seen, when a user changes a viewpoint by rotating or moving a displayed graphic. No special process such as a transparent display of a surface or rebuilding of a solid body, is required. The implementation is easy, and a quick drawing can be made.

What is claimed is:

1. A three-dimensional graphic displaying system for allowing a viewpoint to change, comprising:

data generating means for generating scale mark data for each of variable values corresponding to a coordinate axis, as a combination of two or more lines which exist on a plane perpendicular to a coordinate axis to be displayed, and are not located on an identical straight line, in order to display the coordinate axis; and displaying means for displaying the coordinate axis in correspondence with a position of a viewpoint, by using the generated scale mark data.

2. The three-dimensional graphic displaying system according to claim 1, wherein said data generating means generates the scale mark data in the form that the two or more lines are made respectively parallel to axes other than the coordinate axis to be displayed, and the axes parallel to the two or more lines are made distinct.

3. The three-dimensional graphic displaying system according to claim 2, wherein said data generating means generates the scale mark data by restricting the two or more lines to a range where variable values corresponding to the respectively parallel axes, are positive.

4. The three-dimensional graphic displaying system according to claim 2, wherein said data generating means generates the scale mark data by restricting the two or more lines to a range where variable values corresponding to the respectively parallel axes, are negative.

5. A three-dimensional graphic displaying system for allowing a viewpoint to change, comprising:
   data generating means for generating scale mark data for each of variable values corresponding to a coordinate axis, as a combination of lines, planes, or solids, which are perpendicular to displayed axes, or a combination of any two of a line, plane, and a solid, in order to display the coordinate axis; and
   displaying means for displaying the coordinate axis on a display device in correspondence with a viewpoint position, by using the generated scale data.

6. A three-dimensional graphic displaying system for allowing a viewpoint to change, comprising:
   data generating means for generating vector display data in the form that three or more lines which do not exist on an identical plane, and are shorter than a length corresponding to a size of a vector, are attached to a start or an end point of the vector in a vector display graphic, in order to display the vector; and
   displaying means for displaying the vector display graphic in correspondence with a viewpoint position, by using the generated vector display data.

7. The three-dimensional graphic displaying system according to claim 6, wherein said data generating means generates the vector display data in the form that the three or more lines are made respectively parallel to coordinate axes indicating a display space in which the vector is displayed, and the coordinate axes respectively parallel to the three or more lines, are made distinct.

8. The three-dimensional graphic displaying system according to claim 7, wherein said data generating means generates the vector display data by restricting the three or more lines to a range in which variable values corresponding to the respectively parallel coordinate axes, are positive.

9. The three-dimensional graphic, displaying system according to claim 7, wherein said data generating means generates the vector display data by restricting the three or more lines to a range in which variable values corresponding to the respectively parallel coordinate axes, are negative.

10. The three-dimensional graphic displaying system for allowing a viewpoint to change, comprising:
    data generating means for generating vector display data in the form that two or more surfaces which do not exist on an identical plane, are attached to a start or an end point of a vector in a vector display graphic, in order to display the vector; and
    displaying means for displaying the vector display graphic on a display device in correspondence with a viewpoint position, by using the generated vector display data.

11. A three-dimensional graphic displaying system for allowing a viewpoint to change, comprising:
    data generating means for generating vector display data in the form that a combination of lines, surfaces, or solids, which do not exist on an identical plane, or a combination of a line, surface, and a solid, are attached to a start or an end point of a vector in a vector display graphic, in order to display the vector; and
    displaying means for displaying the vector display graphic on a display device in correspondence with a viewpoint position, by using the generated vector display data.

12. A three-dimensional graphic displaying system for allowing a viewpoint to change, comprising:
    data generating means for generating display data of each of surfaces of an object, and determining a direction in which each of the surfaces is seen from an arbitrary point inside the object, as a right direction of each of the surfaces, in order to display the object; and
    displaying means for determining whether or not each of the surfaces is in the right direction when seen from a viewpoint in correspondence with a viewpoint position, in order to display the object, and displaying only a surface determined to be in the right direction, on a display device, wherein a user identifies an inside of the displayed object from whichever direction of the user viewpoint.

13. The three-dimensional graphic, displaying system according to claim 12, wherein said displaying means displays a frame of a surface, in correspondence with a surface which is not in the right direction, on the display device.

14. A three-dimensional displaying method for properly displaying a graphic even if a user changes a position of a viewpoint from which the user sees a three-dimensional graphic, comprising the steps of:
    generating scale mark data for each of variable values corresponding to a coordinate axis to be displayed, as a combination of two or more lines which exist on a plane perpendicular to the coordinate axis to be displayed, and are not located on an identical straight line, in order to display the coordinate axis; and
    displaying the coordinate axis on a display device in correspondence with the position of the viewpoint, by using the generated scale mark data.

15. A three-dimensional graphic displaying method for properly displaying a graphic even if a user changes a viewpoint from which the user sees a three-dimensional graphic, comprising the steps of:
    generating vector display data in the form that three or more lines which do not exist on an identical plane, and are shorter than a length corresponding to a size of a vector, are attached to a start or an end point of the vector in a vector display graphic, in order to display the vector; and
    displaying the vector display graphic on a display device in correspondence with the position of the viewpoint, by using the generated vector display data.

16. A three-dimensional graphic displaying method for properly displaying a graphic even if a user changes a viewpoint from which the user sees a three-dimensional graphic, comprising the steps of:
    generating display data for each of surfaces of an object, and determining a direction in which each of the surfaces is seen from an arbitrary point inside the object, as a right direction of each of the surfaces, in order to display the object; and
    determining whether or not each of the surfaces is in the right direction when seen from a viewpoint, in correspondence with a position of a user viewpoint; and displaying only a surface determined to be in the right direction, on a display device.

17. A computer-readable storage medium, when used in a three-dimensional graphic displaying system for allowing a viewpoint to change, used to make a computer perform the functions of:
   generating scale mark data for each of variable values corresponding to a coordinate axis to be displayed, as a combination of two or more lines which exist on a plane perpendicular to the coordinate axis to be displayed, and are not located on an identical straight line, in order to display the coordinate axis; and
   displaying the coordinate axis on a display device in correspondence with a position of a user viewpoint, by using the generated scale mark data.

18. A computer-readable storage medium, when used in a three-dimensional graphic displaying system for allowing a viewpoint to change, used to make a computer perform the functions of:
   generating vector display data in the form that three or more lines which do not exist on an identical plane, and are shorter than a length corresponding to a size of a vector, are attached to a start or an end point of the vector in a vector display graphic, in order to display the vector; and
   displaying the vector display graphic on a display device in correspondence with a position of a user viewpoint, by using the generated vector display data.

19. A computer-readable storage medium, when used in a three-dimensional graphic displaying system for allowing a viewpoint to change, used to make a computer perform the functions of:
   generating display data for each of surfaces of an object, and determining a direction in which each of the surfaces is seen from an arbitrary point inside the object, as a right direction of each of the surfaces, in order to display the object;
   determining whether or not each of the surfaces is in the right direction when seen from a viewpoint, in correspondence with a position of the viewpoint of a user; and
   displaying only a surface determined to be in the right direction, on a display device.

20. A three-dimensional graphic displaying system for allowing a viewpoint to change, comprising:
   a data generating device generating scale mark data for each of variable values corresponding to a coordinate axis, as a combination of two or more lines which exist on a plane perpendicular to a coordinate axis to be displayed, and are not located on an identical straight line, in order to display the coordinate axis; and
   a displaying device displaying the coordinate axis in correspondence with a position of a viewpoint, by using the generated scale mark data.

21. The three-dimensional graphic displaying system according to claim 20, wherein said data generating device generates the scale mark data in the form that the two or more lines are made respectively parallel to axes other than the coordinate axis to be displayed, and the axes parallel to the two or more lines are made distinct.

22. The three-dimensional graphic displaying system according to claim 21, wherein said data generating device generates the scale mark data by restricting the two or more lines to a range where variable values corresponding to the respectively parallel axes, are positive.

23. The three-dimensional graphic displaying system according to claim 21, wherein said data generating device generates the scale mark data by restricting the two or more lines to a range where variable values corresponding to the respectively parallel aces, are negative.

24. A three-dimensional graphic displaying system for allowing a viewpoint to change, comprising:
   a data generating device generating scale mark data for each of variable values corresponding to a coordinate axis, as a combination of lines, planes, or solids, which are perpendicular to displayed axes, or a combination of any two of a line, plane, and a solid, in order to display the coordinate axis; and
   a displaying device displaying the coordinate axis on a display device in correspondence with a viewpoint position, by using the generated scale data.

25. A three-dimensional graphic displaying system for allowing a viewpoint to change, comprising:
   a data generating device generating vector display data in the form that three or more lines which do not exist on an identical plane, and are shorter than a length corresponding to a size of a vector, are attached to a start or an end point of the vector in a vector display graphic, in order to display the vector; and
   a displaying device displaying the vector display graphic in correspondence with a viewpoint position by using the generated vector display data.

26. The three-dimensional graphic displaying system according to claim 25, wherein said data generating device generates the vector display data in the form that the three or more lines are made respectively parallel to coordinate axes indicating a display space in which the vector is displayed, and the coordinate axes respectively parallel to the three or more lines, are made distinct.

27. The three-dimensional graphic displaying system according to claim 26, wherein said data generating device generates the vector display data by restricting the three or more lines to a range in which variable values corresponding to the respectively parallel coordinate axes are positive.

28. The three-dimensional graphic displaying system according to claim 26, wherein said data generating device generates the vector display data by restricting the three or more lines to a range in which variable values corresponding to the respectively parallel coordinate axes, are negative.

29. The three-dimensional graphic displaying system for allowing a viewpoint to change, comprising:
   a data generating device generating vector display data in the form that two or more surfaces which do not exist on an identical plane, are attached to a start or an end point of a vector in a vector display graphic, in order to display the vector; and
   a displaying device displaying the vector display graphic on a display device in correspondence with a viewpoint position, by using the generated vector display data.

30. A three-dimensional graphic displaying system for allowing a viewpoint to change, comprising:
   a data generating device generating vector display data in the form that a combination of lines, surfaces, or solids, which do not exist on an identical plane, or a combination of a line, surface, and a solid, are attached to a start or an end point of a vector in a vector display graphic, in order to display the vector; and
   a displaying device displaying the vector display graphic on a display device in correspondence with a viewpoint position, by using the generated vector display data.

31. A three dimensional graphic displaying system for allowing a viewpoint to change, comprising:
   a data generating device generating display data of each of surfaces of an object, and determining a direction in which each of the surfaces is seen from an arbitrary point inside the object, as a right direction of each of the surfaces, in order to display the object; and a displaying device determining whether or not each of the surfaces is in the right direction when seen from a viewpoint in correspondence with a viewpoint position, in order to display the object, and displaying only a surface determined to be in the right direction, on a display device, wherein a user identifies an inside of the displayed object from whichever direction of the user viewpoint.

32. The three-dimensional graphic displaying system according to claim 31, wherein said displaying device displays a frame of a surface, in correspondence with a surface which is not in the right direction, on the display device.

33. A three-dimensional graphic displaying system for allowing a viewpoint to change, comprising a data generating device generating scale mark data for each of variable values corresponding to a coordinate axis, as a combination of two or more lines which exist on a plane perpendicular to a coordinate axis to be displayed, and are not located on an identical straight line, in order to display the coordinate axis.

34. The three-dimensional graphic displaying system according to claim 33, wherein said data generating device generates the scale mark data in the form that the two or more lines are made respectively parallel to axes other than the coordinate axis to be displayed, and the axes parallel to the two or more lines are made distinct.

35. The three-dimensional graphic displaying system according to claim 34, wherein said data generating device generates the scale mark data by restricting the two or more lines to a range where variable values corresponding to the respectively parallel axes, are positive.

36. The three-dimensional graphic displaying system according to claim 34, wherein said data generating device generates the scale mark data by restricting the two or more lines to a range where variable values corresponding to the respectively parallel aces, are negative.

37. A three-dimensional graphic displaying system for allowing a viewpoint to change, comprising a data generating device generating vector display data in the form that three or more lines which do not exist on an identical plane, and are shorter than a length corresponding to a size of a vector, are attached to a start or an end point of the vector in a vector display graphic, in order to display the vector.

38. The three-dimensional graphic displaying system according to claim 37, wherein said data generating device generates the vector display data in the form that the three or more lines are made respectively parallel to coordinate axes indicating a display space in which the vector is displayed, and the coordinate axes respectively parallel to the three or more lines, are made distinct.

39. The three-dimensional graphic displaying system according to claim 38, wherein said data generating device generates the vector display data by restricting the three or more lines to a range in which variable values corresponding to the respectively parallel coordinate axes are positive.

40. The three-dimensional graphic displaying system according to claim 38, wherein said data generating device generates the vector display data by restricting the three or more lines to a range in which variable values corresponding to the respectively parallel coordinate axes, are negative.

41. The three-dimensional graphic displaying system for allowing a viewpoint to change, comprising a data generating device generating vector display data in the form that two or more surfaces which do not exist on an identical plane, are attached to a start or an end point of a vector in a vector display graphic, in order to display the vector.

42. A three dimensional graphic displaying system for allowing a viewpoint to change, comprising:

a data generating device generating display data of each of surfaces of an object, and determining a direction in which each of the surfaces is seen from an arbitrary point inside the object, as a right direction of each of the surfaces, in order to display the object; and said data generating device determines whether or not each of the surfaces is in the right direction when seen from a viewpoint in correspondence with a viewpoint position, in order to display the object, and outputting only a surface determined to be in the right direction, wherein a user identifies an inside of the displayed object from whichever direction of the user viewpoint.

43. The three-dimensional graphic displaying system according to claim 42, wherein said data generating device outputs a frame of a surface, in correspondence with a surface which is not in the right direction.

* * * * *